Oct. 11, 1966  J. J. FANNON, JR., ET AL  3,278,722
ELECTRIC INFRA-RED RADIANT SPACE HEATER UNIT
Filed Dec. 29, 1961  16 Sheets-Sheet 1
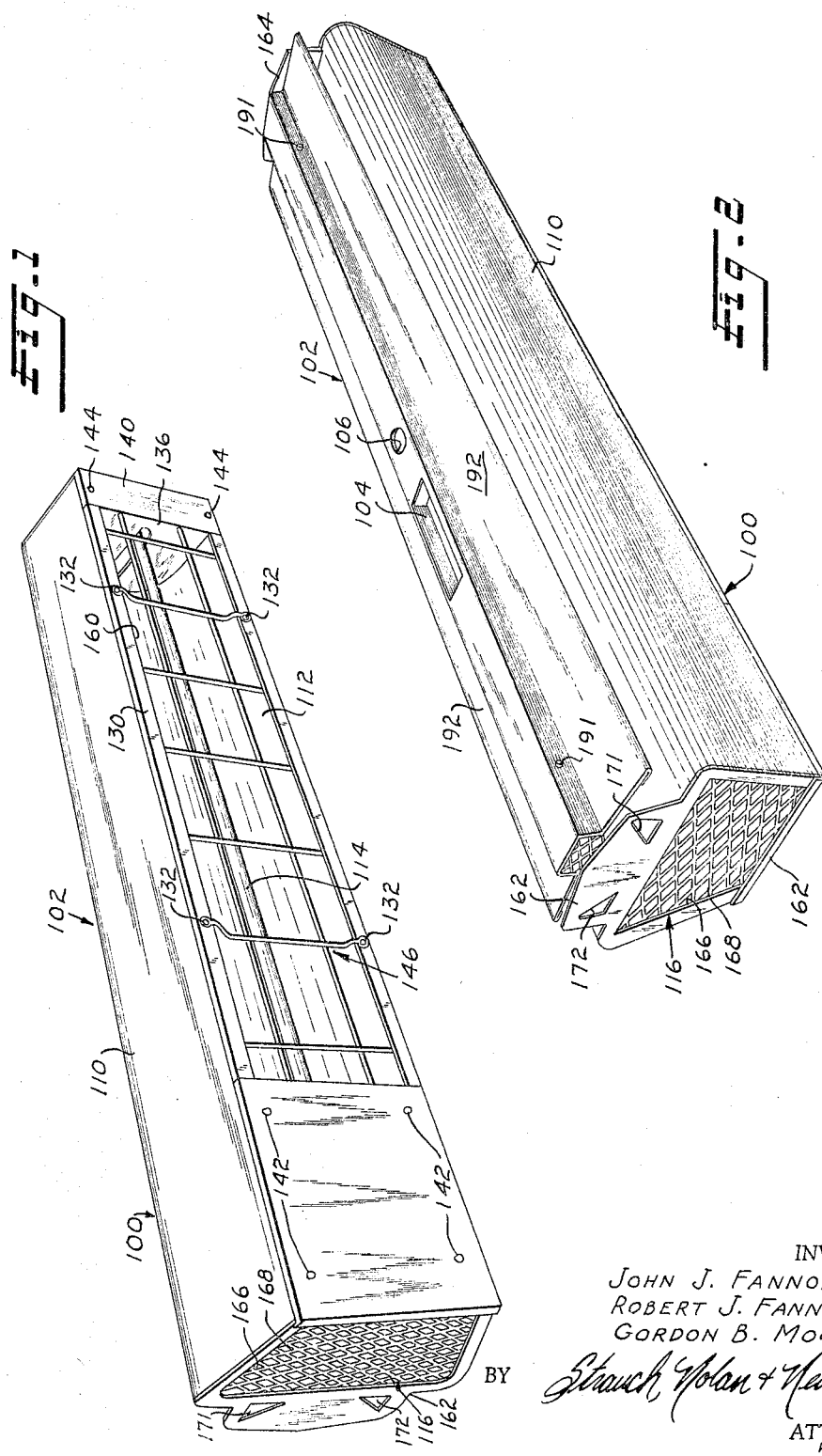
INVENTORS
JOHN J. FANNON, JR.
ROBERT J. FANNON
GORDON B. MOODY
BY Strauch, Nolan & Neale
ATTORNEYS

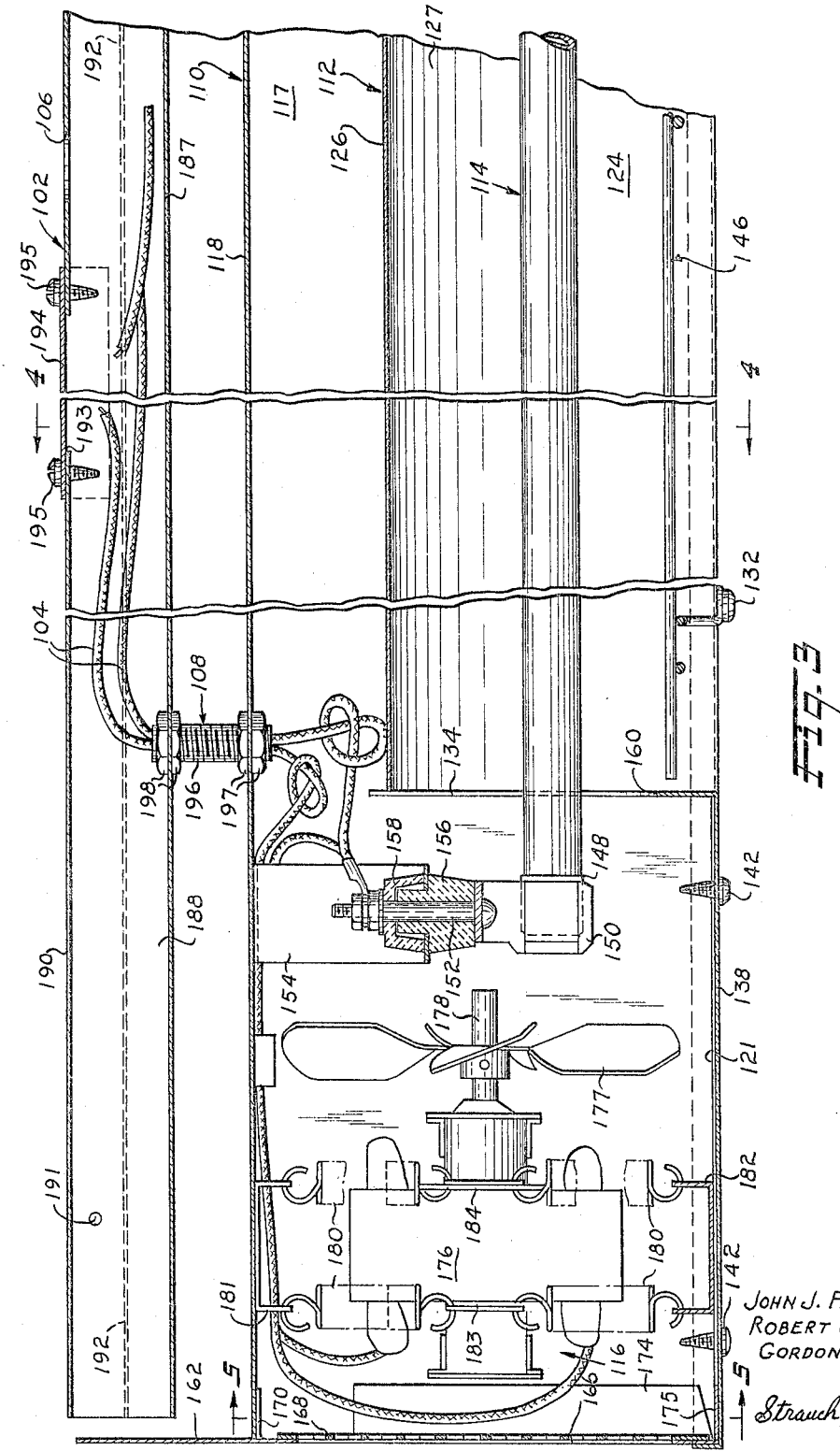

Oct. 11, 1966  J. J. FANNON, JR., ET AL  3,278,722
ELECTRIC INFRA-RED RADIANT SPACE HEATER UNIT
Filed Dec. 29, 1961  16 Sheets-Sheet 3
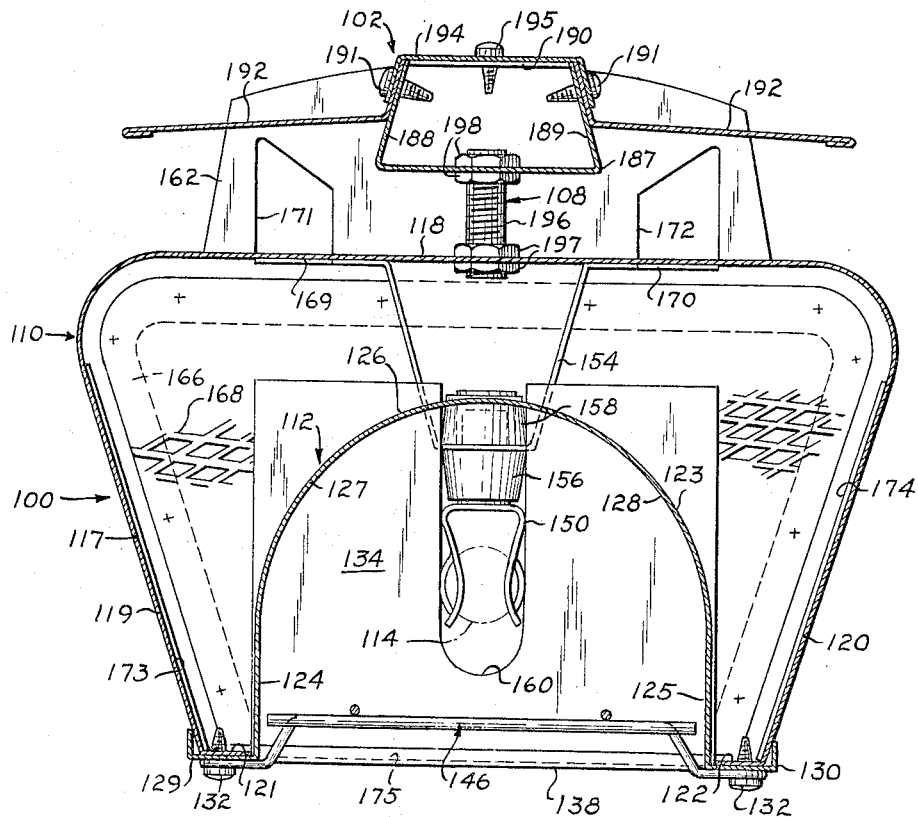
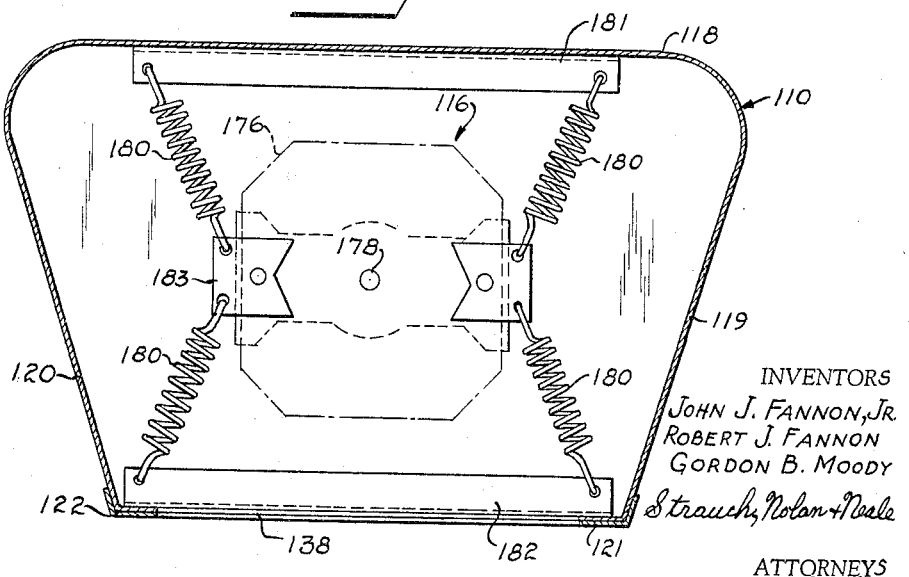
INVENTORS
John J. Fannon, Jr.
Robert J. Fannon
Gordon B. Moody
Strauch, Nolan + Neale
ATTORNEYS

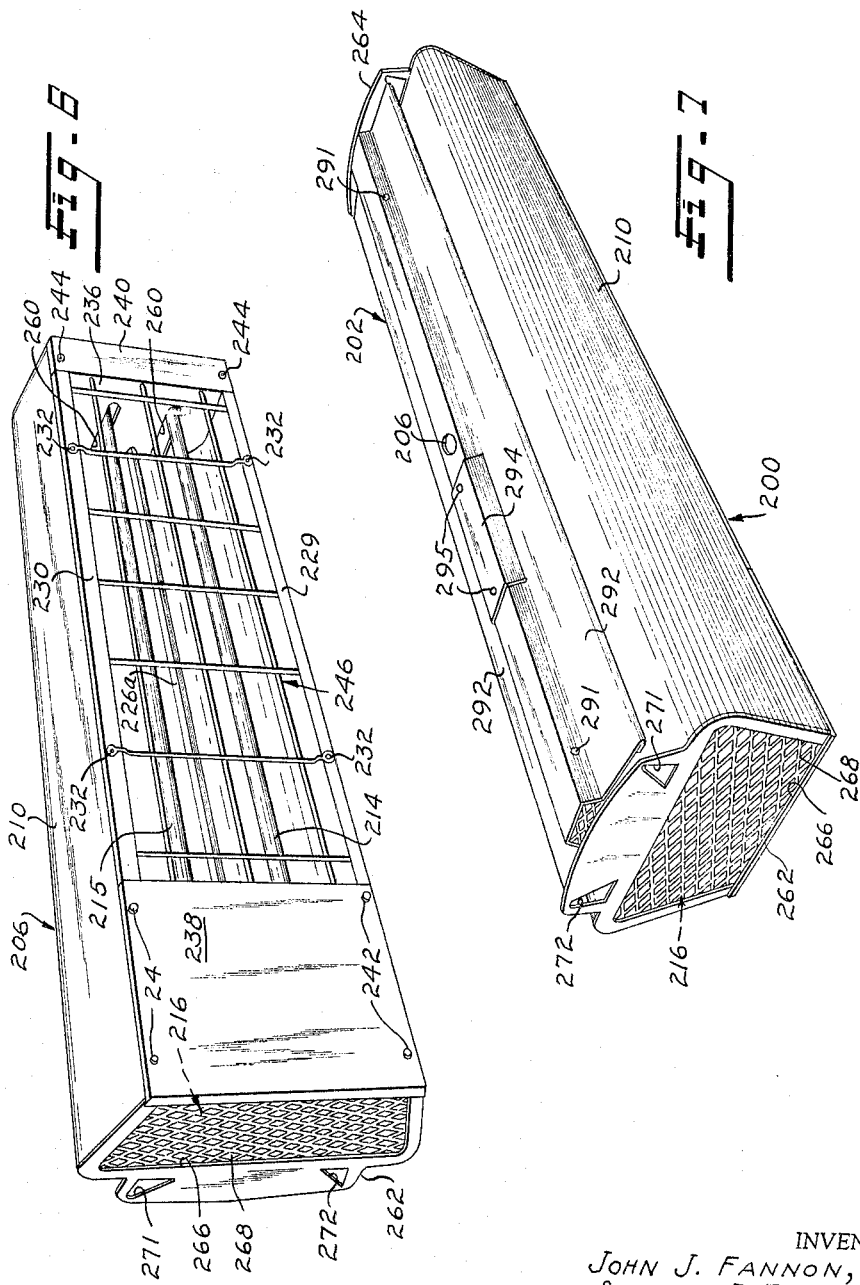

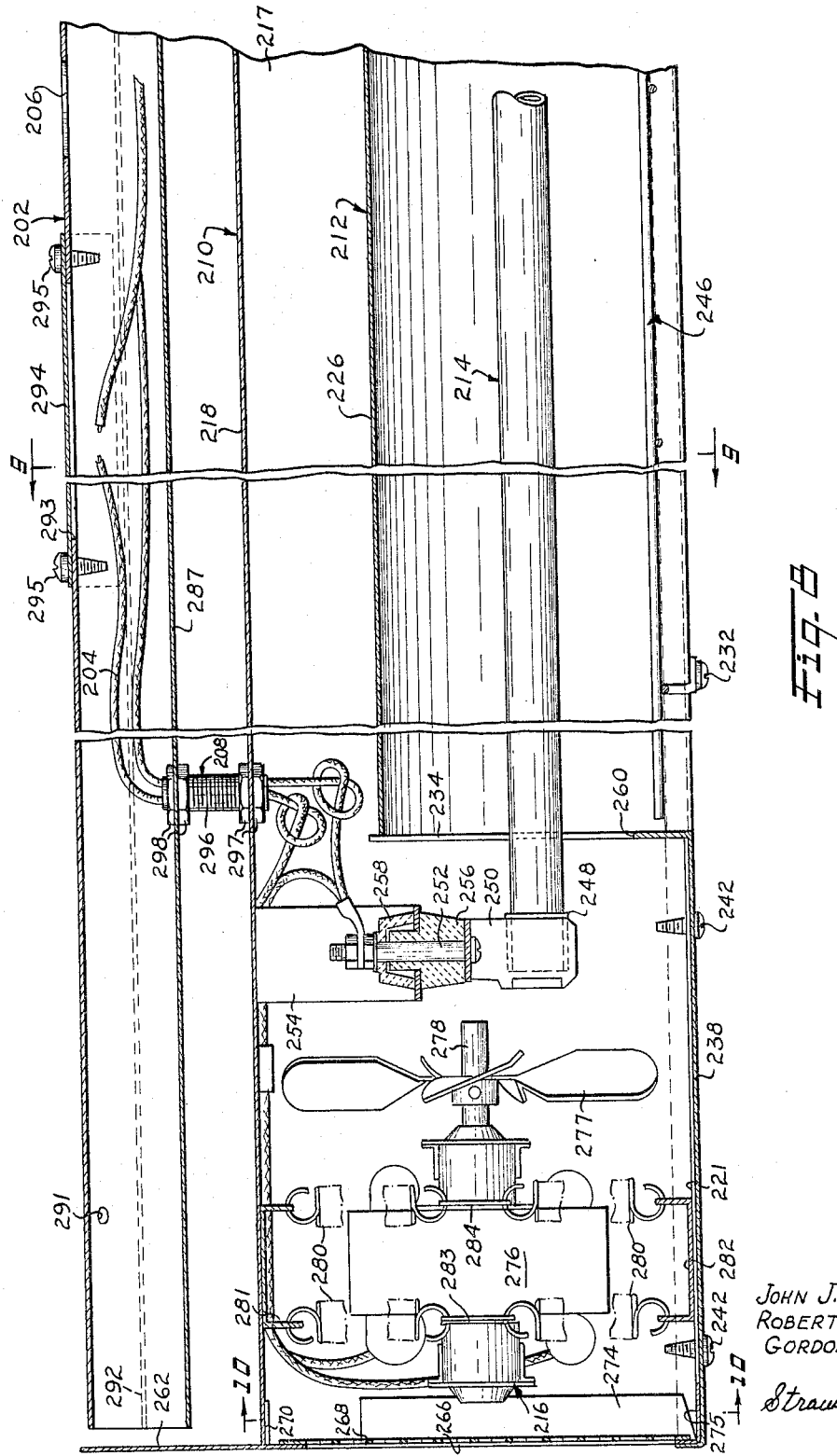

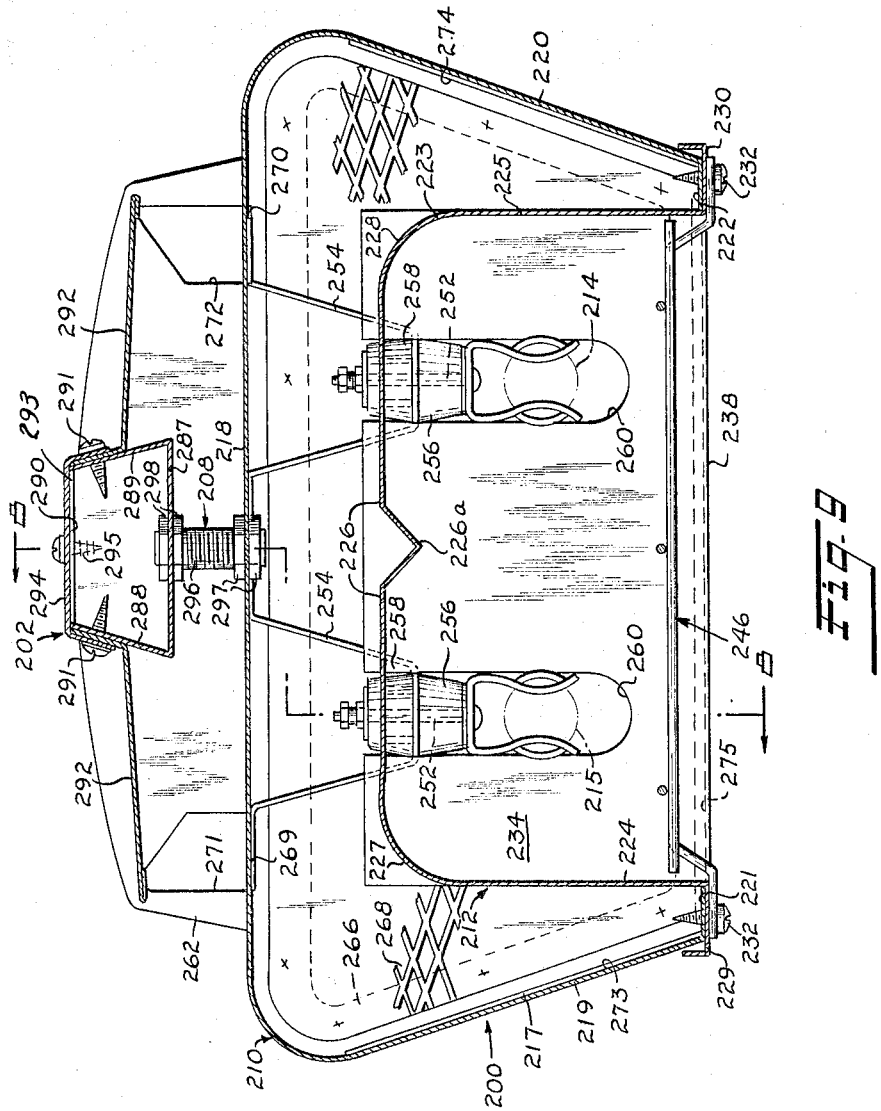

Oct. 11, 1966   J. J. FANNON, JR., ET AL   3,278,722
ELECTRIC INFRA-RED RADIANT SPACE HEATER UNIT
Filed Dec. 29, 1961
16 Sheets-Sheet 7

INVENTORS
JOHN J. FANNON, JR.
ROBERT J. FANNON
GORDON B. MOODY
BY Strauch, Nolan & Neale
ATTORNEYS Oct. 11, 1966  J. J. FANNON, JR., ET AL  3,278,722
ELECTRIC INFRA-RED RADIANT SPACE HEATER UNIT
Filed Dec. 29, 1961  16 Sheets-Sheet 8
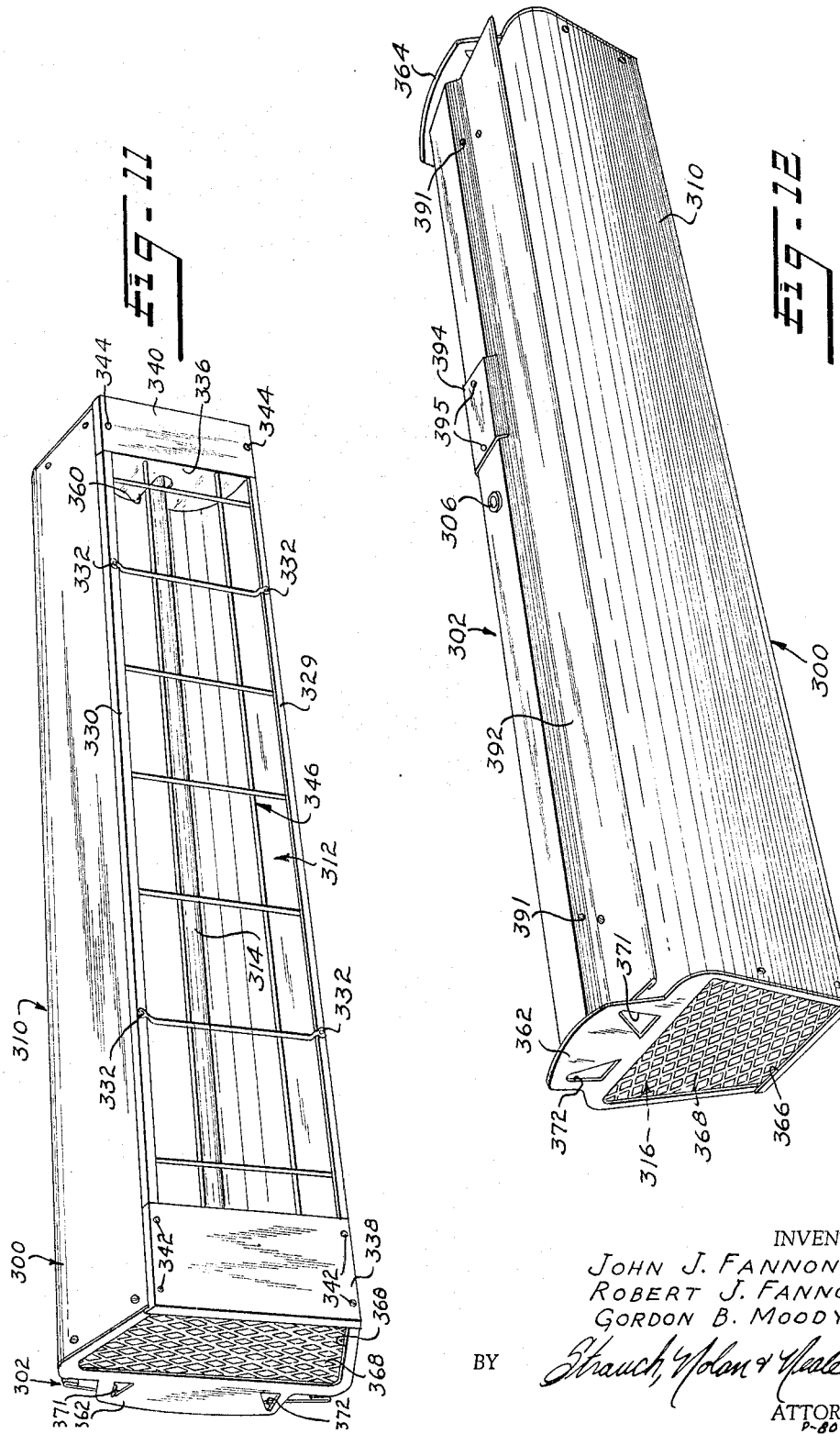
INVENTORS
JOHN J. FANNON, JR
ROBERT J. FANNON
GORDON B. MOODY
BY Strauch, Nolan & Neale
ATTORNEYS

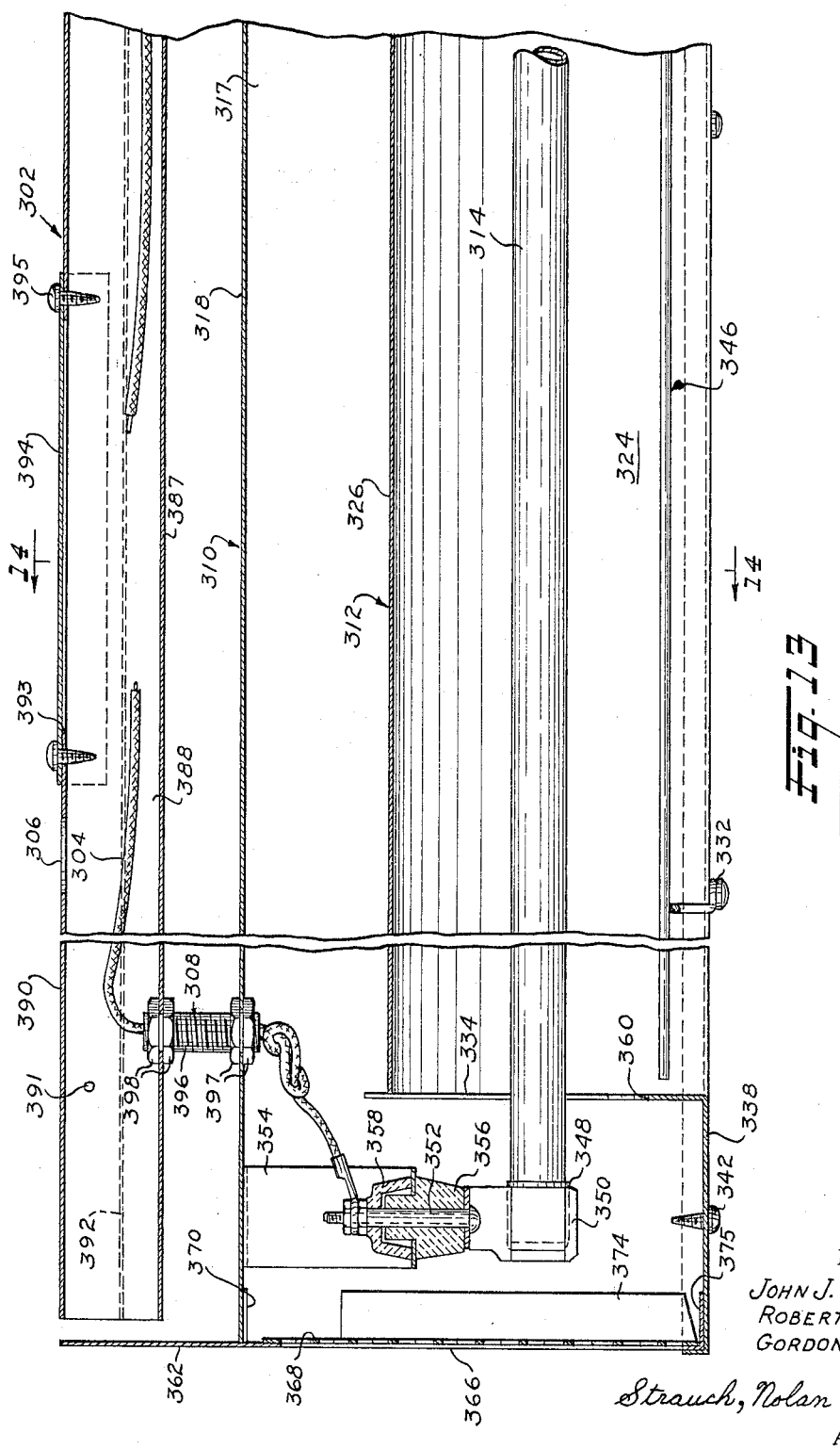

Oct. 11, 1966    J. J. FANNON, JR., ET AL    3,278,722
ELECTRIC INFRA-RED RADIANT SPACE HEATER UNIT
Filed Dec. 29, 1961    16 Sheets-Sheet 10

INVENTORS
JOHN J. FANNON, JR.
ROBERT J. FANNON
GORDON B. MOODY
BY Strauch, Nolan & Neale
ATTORNEYS

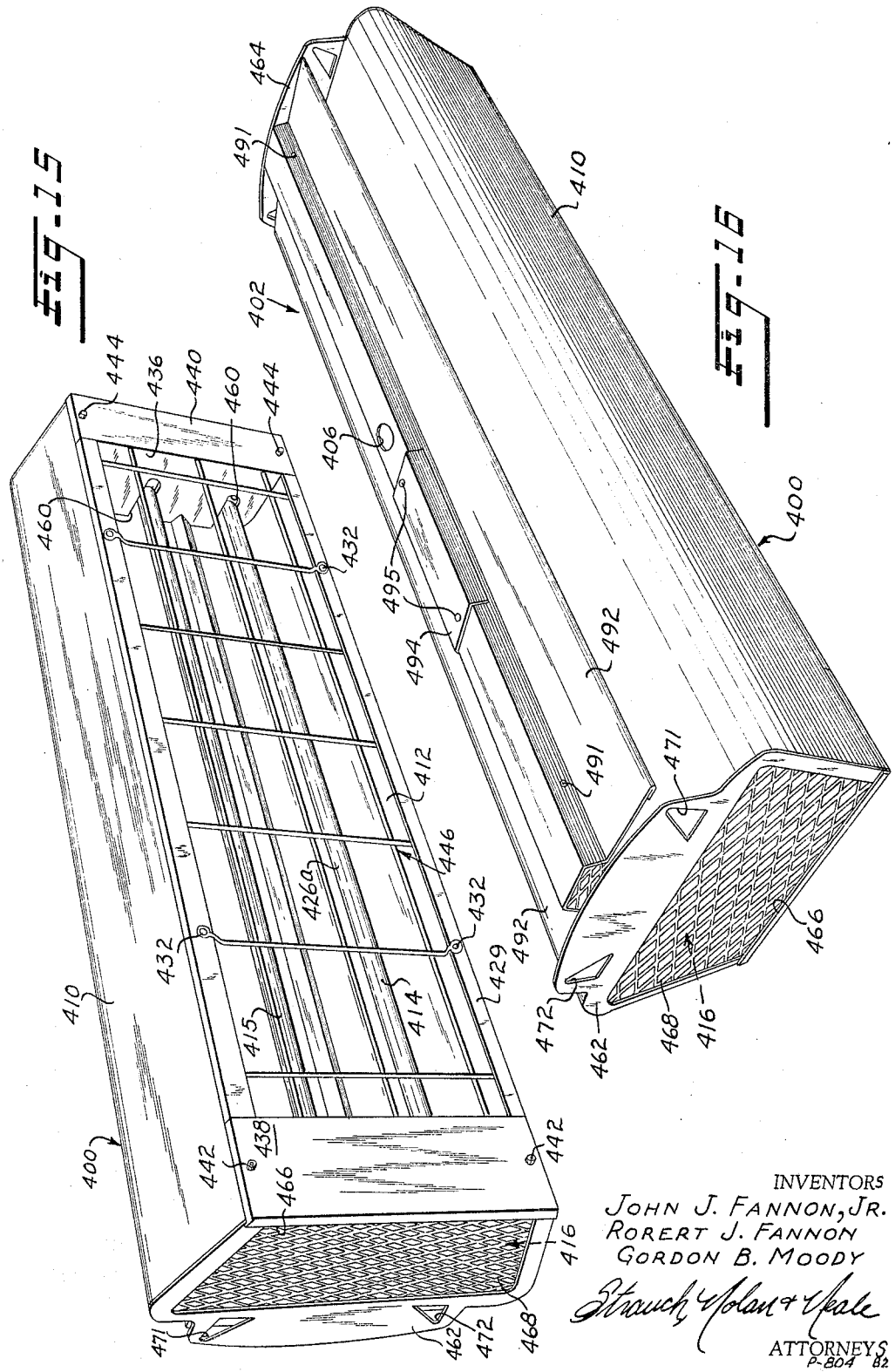

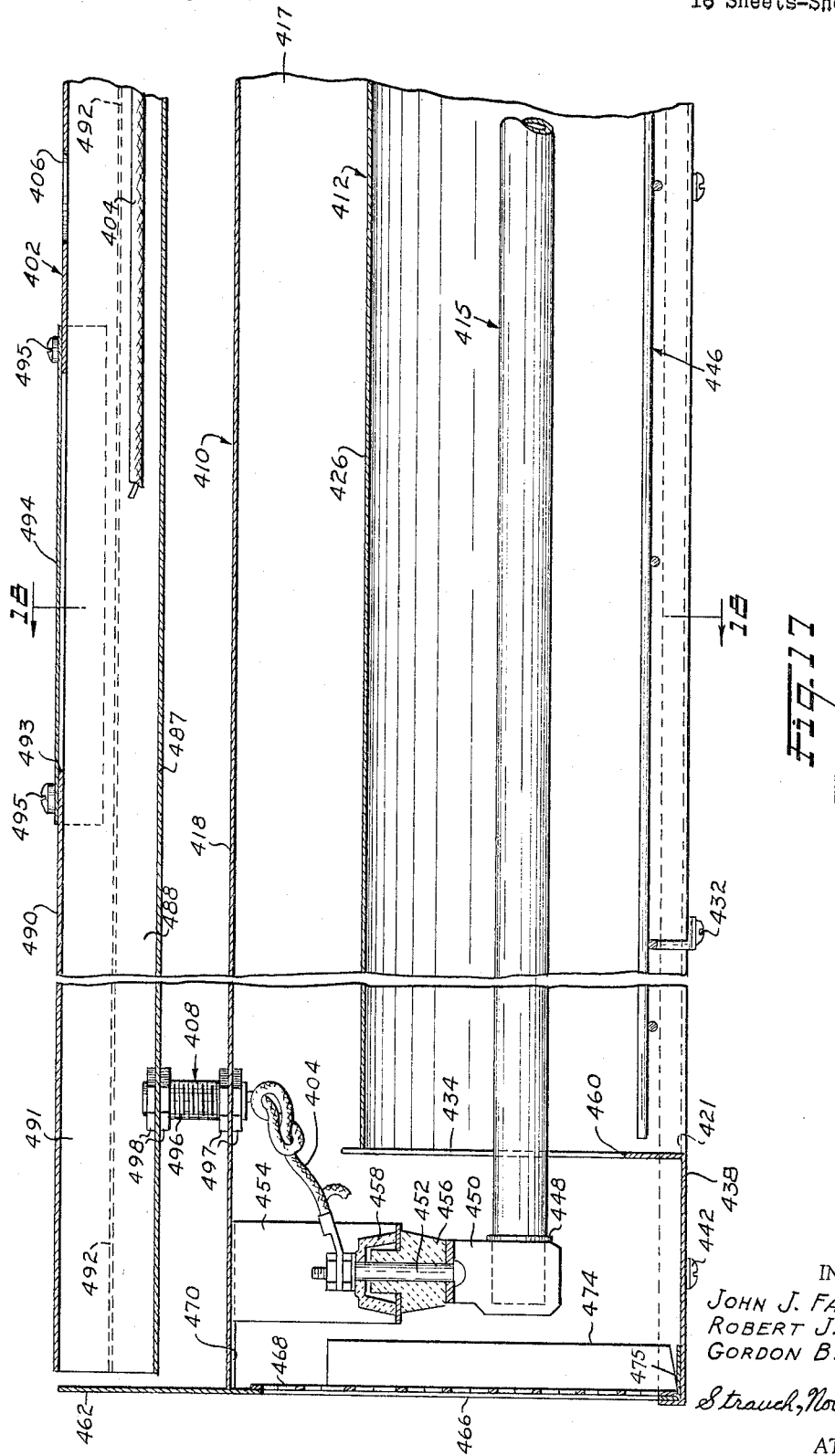

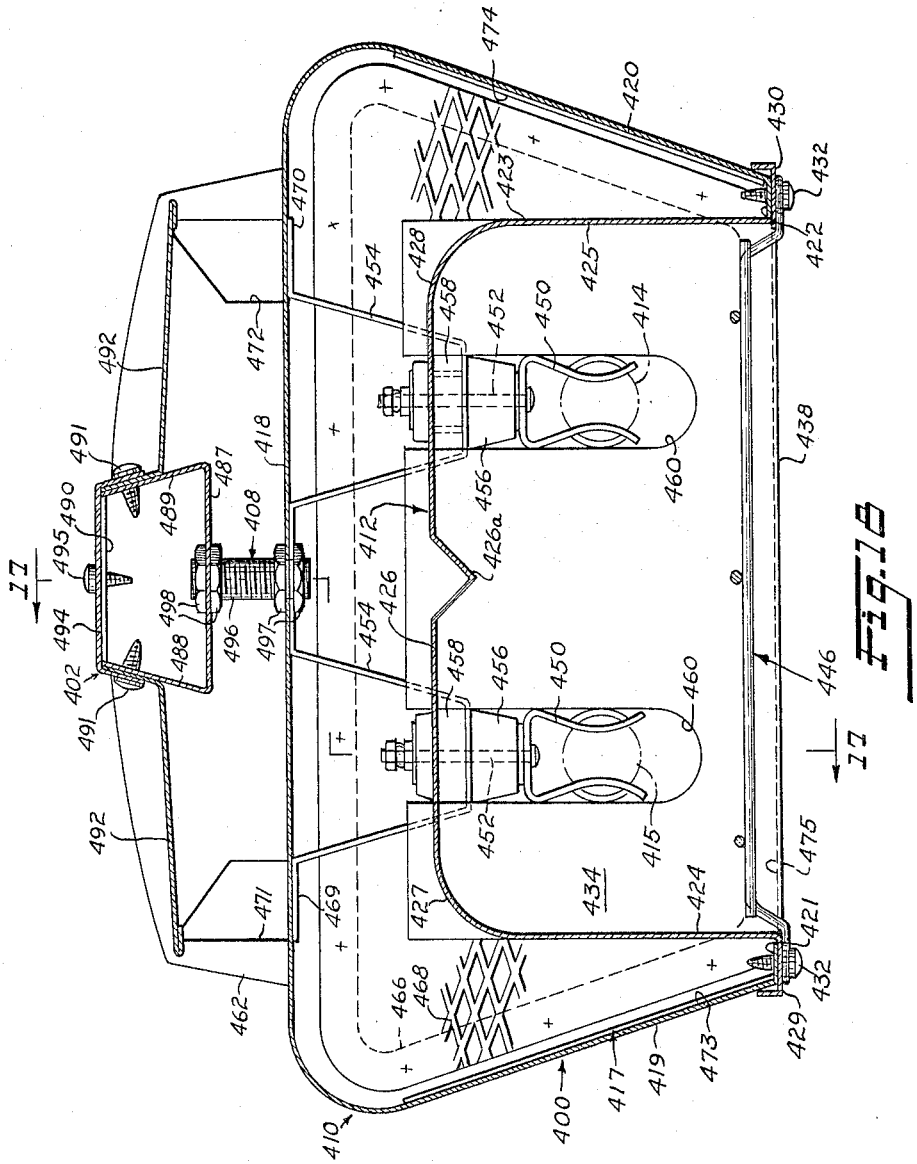

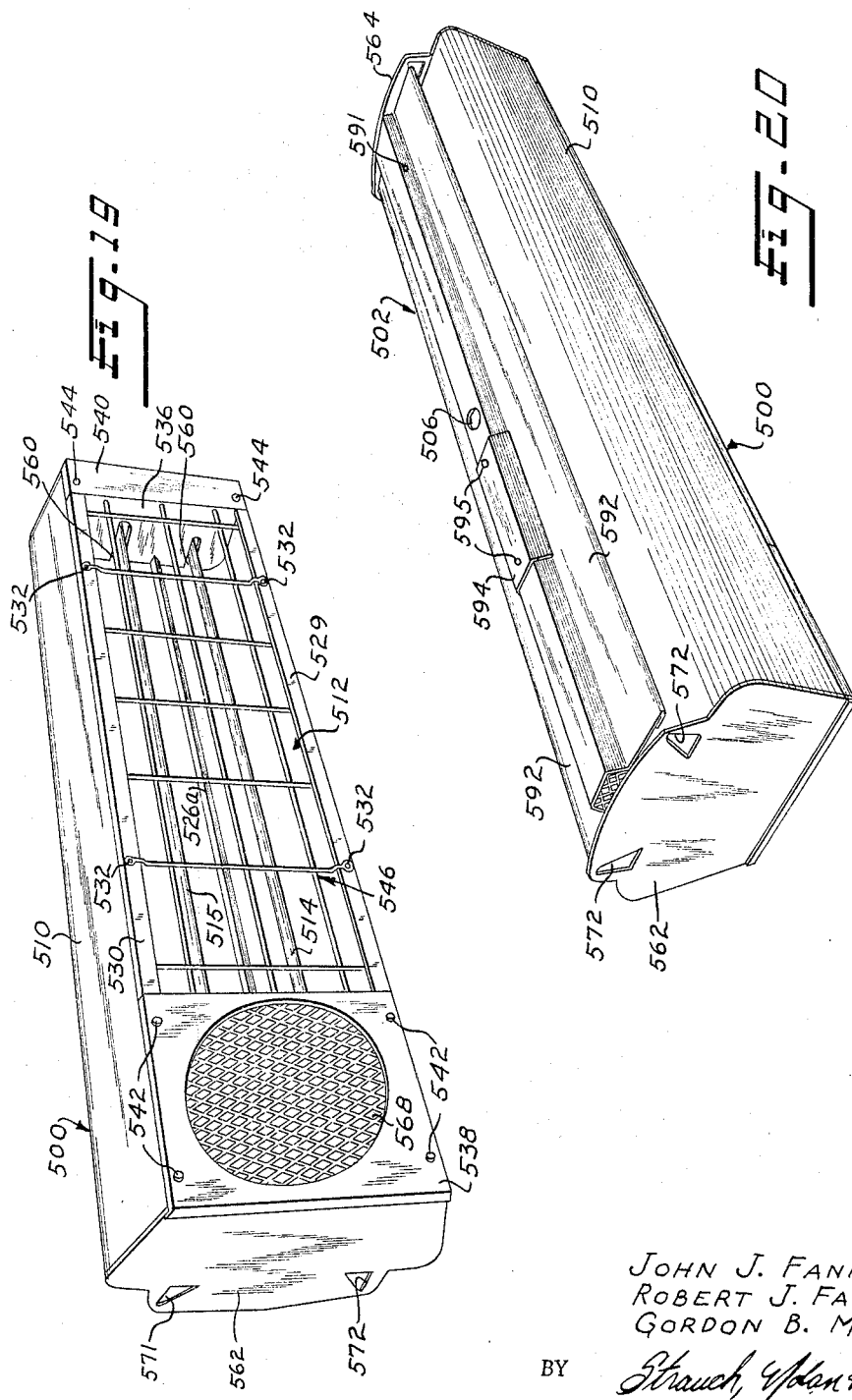

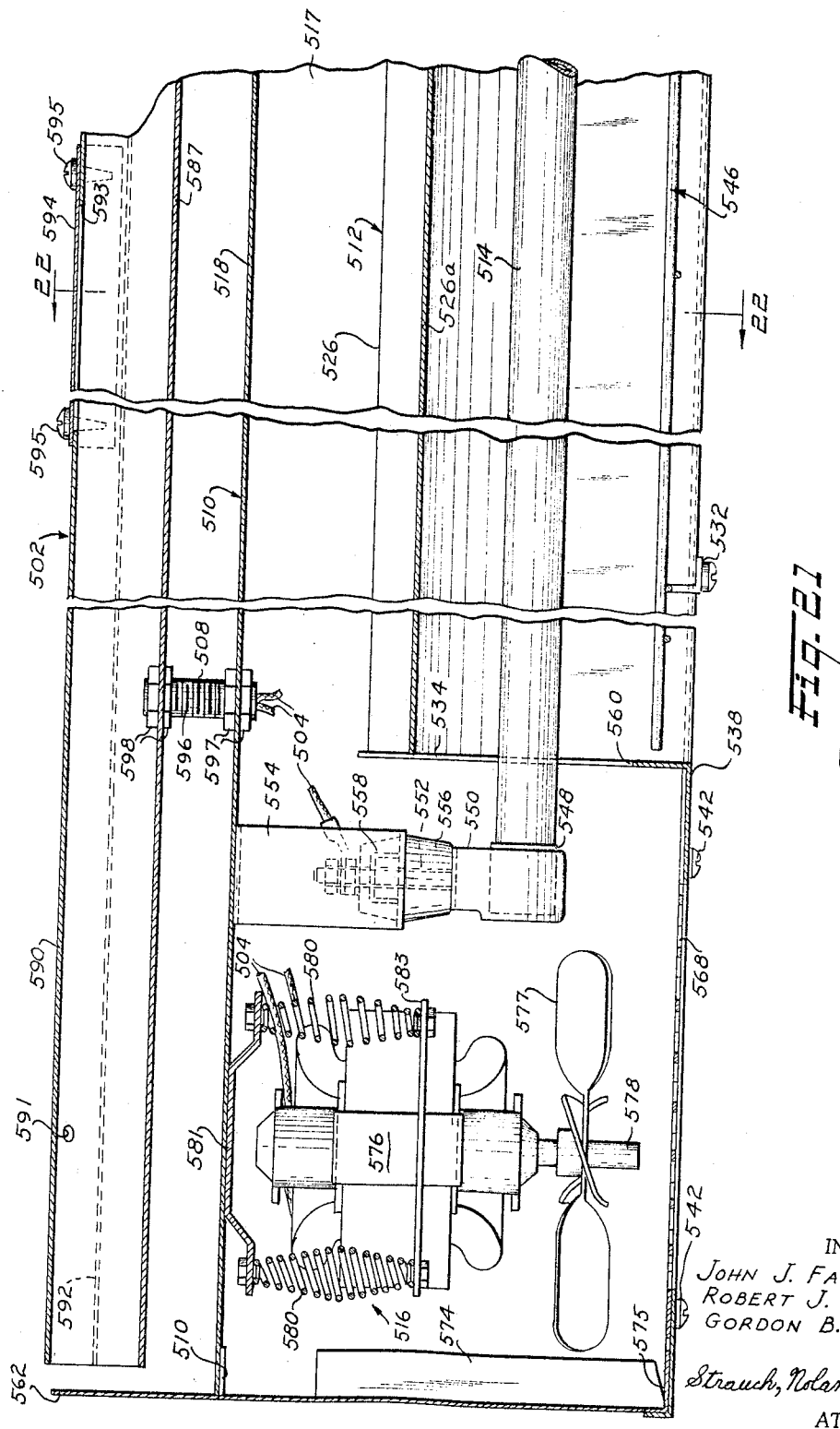

Oct. 11, 1966  J. J. FANNON, JR., ET AL  3,278,722
ELECTRIC INFRA-RED RADIANT SPACE HEATER UNIT
Filed Dec. 29, 1961  16 Sheets-Sheet 16

INVENTORS
JOHN J. FANNON, JR.
ROBERT J. FANNON
GORDON B. MOODY
BY Strauch, Nolan & Neale
ATTORNEYS

United States Patent Office 3,278,722
Patented Oct. 11, 1966

3,278,722
ELECTRIC INFRA-RED RADIANT SPACE HEATER UNIT
John J. Fannon, Jr., and Robert J. Fannon, Grosse Pointe Park, and Gordon B. Moody, Royal Oak, Mich., assignors to Hupp Corporation, Cleveland, Ohio, a corporation of Virginia
Filed Dec. 29, 1961, Ser. No. 163,113
28 Claims. (Cl. 219—343)

The present invention relates to radiant heaters and, more particularly, to improvements in electrically powered infra-red radiant heaters.

Electrical infra-red radiant heaters of various forms have been known for many years. Examples will be found in United States Letters Patent No. 2,131,484 issued Sept. 27, 1938 to C. Ringwald for Heater; No. 2,439,005 issued Apr. 6, 1948 to F. V. Jensen for Oven With Infra-Red Lamp; No. 2,599,029 issued June 3, 1952 to C. H. Turner et al. for Electric Heater; No. 2,764,664 issued Sept. 25, 1956 to E. J. Stewart for Apparatus for Infra-Red Cooking; No. 2,844,699 issued July 22, 1958 to W. J. Miskella for High Heat Infra-Red Lamp Holder; and No. 2,981,819 issued Apr. 25, 1961 to J. J. Gregory for Heater Construction for Kiln or Other Apparatus.

The primary object of the present invention is to provide an improved dual purpose electrically powered infra-red radiant heater which is so constructed that it may be utilized, without modification, either for general space heating or concentrated spot heating.

More specifically, it is an object of the present invention to provide a dual purpose electrical infra-red radiant heater having an improved reflector of channel-shape construction surrounding an elongated electrically powered infra-red radiant and so constructed that radiation from the radiant will be concentrated upon an object placed closely adjacent the reflector but will be widely diffused if the radiation is not intercepted closely adjacent the reflector.

Still more specifically, it is an object of the present invention to provide an electrically powered infra-red heater having an elongated radiant and a channel-shaped reflector surrounding the radiant and having substantially parallel side walls parallel to the longitudinal axis of the radiant and located outwardly of the radiant so that radiation from the radiant will be concentrated upon an object placed closely adjacent the opening in the reflector and yet be widely diffused if the radiation is not intercepted closely adjacent the open side of the reflector.

A further object of the present invention is to provide an electrically powered infra-red radiant heater in which the heating unit is suspended from an elongated rigid conduit carrying the electric power leads for the radiant of the heater unit so that the input leads are isolated from the heat produced by the radiant.

A further object of the present invention is to provide a space heater adapted to be mounted on the ceiling or a like support without danger of over heating of the ceiling or support by the provision of multiple air shields and heat distribution surfaces isolating the radiant of the heater unit from the support surface from which the heater is suspended.

A further important object of the present invention is to provide an improved cooling arrangement for electrically powered infra-red heater units which prevents over heating of the housing and of the electrical input leads thereto.

These and other objects of the present invention will become more fully apparent by reference to the appended claims and as the following detailed description proceeds in reference to the accompanying drawings wherein:

FIGURE 1 is a perspective view from beneath of an air cooled single radiant space heater in accord with the present invention and constituting a first embodiment thereof;

FIGURE 2 is a perspective view from above of the space heater of FIGURE 1;

FIGURE 3 is a vertical longitudinal center line section through the heater of FIGURE 1;

FIGURE 4 is a transverse sectional view taken substantially along the line 4—4 of FIGURE 3 but with the cooling air circulation fan removed for clarity of illustration;

FIGURE 5 is a transverse sectional view taken substantially along the line of 5—5 of FIGURE 3 and illustrating the mounting of the cooling air circulation fan;

FIGURE 6 is a perspective view from beneath of an air cooled double radiant space heater in accord with the present invention and constituting a second embodiment thereof;

FIGURE 7 is a perspective view from above of the space heater of FIGURE 6;

FIGURE 8 is a vertical longitudinal center line sectional view of the heater of FIGURE 6;

FIGURE 9 is a transverse sectional view taken substantially along the line of 9—9 of FIGURE 8 but with the cooling air circulation fan removed for clarity of illustration;

FIGURE 11 is a perspective view from below of a single radiant space heater constructed in accord with the present invention and constituting a third embodiment thereof;

FIGURE 12 is a perspective view from above of the heater of FIGURE 11;

FIGURE 13 is a vertical longitudinal center line sectional view of the space heater of FIGURE 11;

FIGURE 15 is a perspective view from below of a double radiant space heater in accord with the present invention and constituting a fourth embodiment thereof;

FIGURE 16 is a perspective view from above of the space heater of FIGURE 15;

FIGURE 17 is a vertical longitudinal center line sectional view of the space heater of FIGURE 15;

FIGURE 18 is a transverse sectional view taken substantially along the line 18—18 of FIGURE 17;

FIGURE 19 is a perspective view of an air cooled double radiant space heater in accord with the present invention constituting a fifth embodiment thereof;

FIGURE 20 is a perspective view from above of the heater of FIGURE 19;

FIGURE 21 is a vertical longitudinal center line sectional view of the heater of FIGURE 19;

FIRST EMBODIMENT

Figure 10:
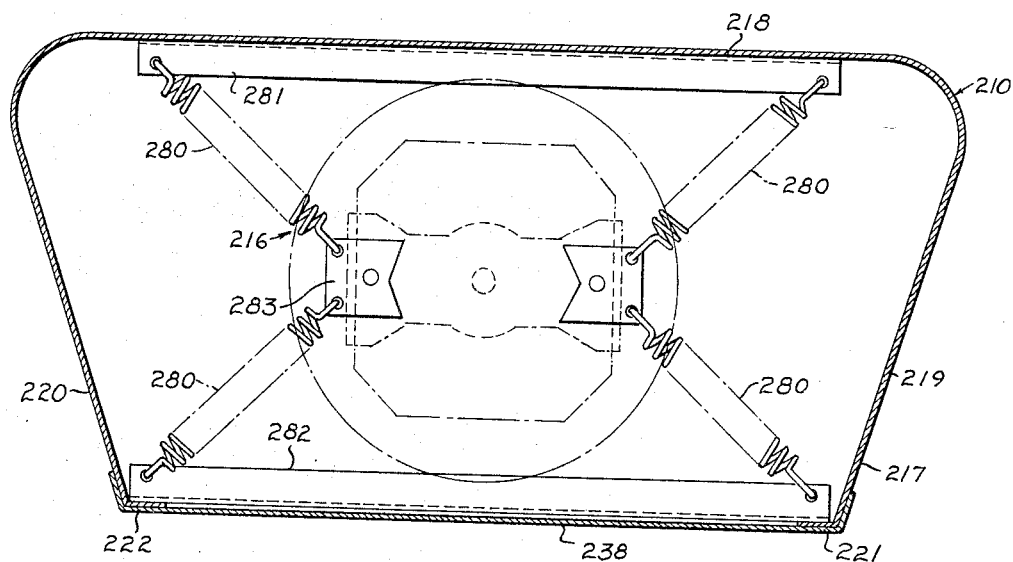
FIGURE 10 is a transverse sectional view illustrating the mounting of the cooling air circulation fan taken substantially along the line 10—10 of FIGURE 8.

Referring now in detail to the drawings and particularly to FIGURES 1 and 2, the first embodiment of the space heater of the present invention comprises an elongated heater unit 100 and a substantially equally elongated rigid conduit 102 housing the electrical leads 104 for the unit 100. The over-all length of the unit 100 in one commercial form is 34″. Conduit 102 has at its center a collar 106 by which it may be mounted on or hung from a ceiling or other suitable support. Underwriters laboratories recommend that the heater be mounted a minimum of 12″ from any combustible wall or ceiling. The burner unit 100 is suspended from the conduit 102 adjacent its opposite ends by tubular connectors 108 (FIGURE 3) adjacent the opposite ends of the unit 100 and conduit 102. Conduit 102 is arranged to isolate leads 104 and the support on which the heater is mounted from the heat emitted by the unit 100.

Referring to FIGURES 1 and 4, the heater unit 100, in this embodiment, basically comprises an outer housing 110, a reflector 112, a radiant 114 and a blower 116 (FIGURE 3).

Referring again to FIGURE 4, the housing 110 comprises a sheet metal member 117 having a top wall 118 converging depending side walls 119 and 120 and coplanar in-turned edge flanges 121 and 122 extending longitudinally thereof. The reflector 112 includes an elongated inverted channel-shape sheet metal member 123 having parallel side walls 124 and 125, a base wall 126 having curved portions 127 and 128 by which it is joined to side walls 124 and 125 and laterally outwardly extending flanges 129 and 130 overlying the housing flanges 121 and 122 respectively and fixed thereto by screws 132. In this embodiment, reflector member 123 is of substantially U-shape in cross-section and terminates short of the ends of housing member 117 at reflector end walls 134 and 136. Reflector member 123 and housing member 117 define a channel-shaped air chamber therebetween. The reflector end walls 134 (FIGURE 4) and 136 (FIGURE 1) are formed by upturned portions of housing plate or cover members 138 and 140 fixed to the housing flanges 121 and 122 at the opposite ends of the channel-shaped reflector member 123 by screws 142 and 144 as is shown in FIGURE 1.

The open side of the reflector is covered by an open mesh wire grill 146 fixed to the housing 110 by the screws 132.

The radiant 114 is a quartz-type infra-red electrical heating element of conventional structure having stainless steel ferrules 148 (FIGURE 3) at its opposite ends. In said one commercial form, radiant 114 is a 1500 watt, ⅝" fused quartz heating element 28" long with a 23" hot zone. The unit 100 in said one commercial form is wired for a 110 volt single phase source and draws 13.53 amps. Radiant 114 extends longitudinally of the channel formed by the reflector 112 and projects at its opposite ends through the end plates 134 and 136 and is suspended from the housing top wall 118 at each end as is illustrated for one end in FIGURE 3 by a contact pressure clip 150. Clips 150 are fixed by bolts 152 to brackets 154 welded to the top wall 118 of housing 110. Bolts 152 are thermally and electrically isolated from the bracket 154 by the complementary inter-fitting ceramic insulators 156 and 158. The reflector end walls 134 and 136 are formed with upwardly opening notches 160, as is illustrated in FIGURE 4 in reference to the end wall 134 of reflector 112, the side walls of which embrace the radiant 114 adjacent its ends.

In this embodiment, the longitudinal axis of the radiant 114 is spaced substantially equidistant from the parallel side walls 124 and 125 and at a distance from the base wall 126 which is less than the radius of curvature of this substantially semi-cylindrical end wall 126.

By this arrangement, energy radiating from the radiant 114 against the channel-shaped reflector 112 will be directed outwardly through the open side thereof. The reflector 112 of the present invention differs from prior art reflectors primarily in that the portions 124 and 125 are substantially parallel rather than widely divergent. In this unit 100, the longitudinal axis of the radiant 114 is not located at the focus of the curvature of the reflector 112 but more closely to the center of wall 126. By the combined effect of the form of the reflector 112 with its parallel side walls 124 and 125 and the location of the axis of the radiant 114 as shown, the radiation emitted from the space heater 100 results in a highly efficient dual purpose heater unit. As will become apparent by reference to the succeeding embodiments, the parallel reflector surfaces provided by walls 124 and 125 outwardly of radiant 114 decrease radiation diffusion for spot heating of closely positioned objects but increase radiation diffusion for space heating. A concentrated beam of radiant energy is directed upon an object placed closely adjacent the open side of the channel of reflector 112 but wide diffusion of the radiation results when the heater is utilized solely for space heating and the radiation is not intercepted closely adjacent the outlet of the reflector. The reflector, as illustrated in FIGURE 4 and in the relation to the radiant 114 as there illustrated, has been found to produce an efficiency of 76%. This is therefore an excellent reflector and yet achieves the advantages of providing either concentration upon a closely positioned object or diffusion for general space heating. The result is that this unit as illustrated in FIGURES 1 through 4 can be used as a space heater mounted against the ceiling of a room of factory, for example, and provide efficient diffusion of radiant heat throughout the space to be heated and also be used, without modification, for concentration of radiant energy upon a closely spaced object to be heated as, for example, in the drying and curing of coatings upon sheet metal.

The opposite end walls of the housing 110 are formed by plate members 162 and 164 each of the construction illustrated in FIGURES 1 through 4 in detail for the end plate 162. End plates 162 and 164 are generally in the form of keystones, each having a central opening 166 over which a grill 168 is secured by spot welding to the interior of the plate 162 as is best shown in FIGURE 4. Grill 168 is formed of expanded metal of conventional construction. The plate 162 has right angularly bent tabs 169 and 170 resulting in the openings 171 and 172, edge tabs 173 and 174 and bottom tab 175 which inter-fit within the open ends of the tubular housing structure formed by the channel-shaped housing member 119 and the plates 136 and 138 secured thereto. The end plates 162 and 164 may be secured in position by spot welding of these tabs to the channel-shaped member for example.

As is apparent from FIGURE 1, the space between the reflector end plate 134 and the housing end plate 162 is substantially greater than that between the reflector end plate 136 and the housing end plate 164. This greater spacing provides a chamber to receive the blower unit 116. This blower unit comprises an electrical motor 176 having a blower rotor in the form of a fan 177 secured to its output shaft 178. Fan motor 176 in said one commercial form is a 1/60 horsepower, 110 volt, 60 cycle A.C. motor operating at 3000 r.p.m.. The fan 177 has four blades of 4" diameter. The unit 116 is resiliently suspended within the housing 110 by two sets of four springs 180, the springs of each set being arranged as is best illustrated in FIGURE 5. A channel member 181 is fixed to the top wall 118 of the housing and a channel member 182 is fixed between the longitudinally extending flanges 121 and 122 of the housing. Plates 183 and 184 are fixed to the stator of the motor 176 at opposite ends as is best illustrated in FIGURE 3. The springs 180 are each connected at one end to one of the channel members 181 and 182 and at the other end to one of the plates 183 and 184. These springs are tension-type coil springs and, in the installed position of the motor 176, are under tension. The axes of these springs lie in planes normal to the axis of rotation of shaft 178. By this construction, the entire blower unit 116 is resiliently suspended relative to the housing 110 so that any vibration resulting from its operation is isolated from housing 110 and radiant 114. Blower unit 116 induces flow of air through the grill 166 in the end plate 164, along the reflector 112 through the channel-shaped chamber formed between the member 117 of housing 110 and the exterior surface of the member 123 of reflector 112 and discharges air through the outlet grill 168 in the end plate 162. Access to the blower 116 for maintenance purposes is obtained through the opening resulting after removal of the member 138.

Referring now to FIGURES 3 and 4, the conduit 102 comprises a sheet metal channel-shaped member 187 having converging side walls 188 and 189 and a cover member 190 coextensive in length with the channel member 187 and secured thereto by screws 191 as is best shown in FIGURE 2. Cover member 190 has laterally projecting longitudinally extending cooling fins 192 overlying in spaced relation the top wall 118 of the housing 110. These cooling fins 192 shield the support such as a ceiling from housing 117 and permit rapid dissipation to atmosphere of heat transmitted to the conduit 102 through the connectors 108 from the housing 110. The cover 190 is provided with an access opening 193 closed by a further cover member 194 fixed thereto by screws 195 providing access to the wiring 104 within the longitudinally extending opening through conduit 102.

As is best illustrated in FIGURE 4, the connectors 108 comprise an externally threaded bushing 196 extending through aligned apertures in the top wall 118 of the housing and the base wall of the conduit channel member 187 and fixed relative thereto by opposed pairs of nuts 197 and 198. The lead wires 104 extend through the bushings 196 and are connected to the terminal bolts 152 as shown in FIGURE 3 and to the motor 176 of blower 116.

By this construction, the wiring 104 is located in the conduit 102 which is isolated from the radiant 114 by the conduit 102 which is cooled by cooling fins 192, by the space between the channel member 187 and the top wall 118 of the housing 110 and by the channel-shaped stream of air flowing between the exterior of the reflector 112 and the interior of the housing 110 between the inlet end plate 164 and the outlet end plate 162 under the influence of the blower 116. The air flowing in this channel-shaped stream flows over the surface of the reflector 112 to cool it, flows over the interior surface of the housing 118 to prevent its heating to a temperature at which its exterior decorative paint would blister and by isolating the insulated electrical leads 104 from high temperatures, avoids heat generated deterioration thereof. The air stream is isolated from radiant 114 and thus does not lower its surface temperature and its radiating efficiency. The heated air is discharged into the surrounding atmosphere and thus augments the radiant heating effect of radiant 114 as a space heater.

SECOND EMBODIMENT

The second embodiment is similar to the first but has multiple radiants providing a higher heating capacity. Referring now to FIGURES 6 and 7, the second embodiment of the space heater of the present invention comprises an elongated heater unit 200 and a substantially equally elongated rigid conduit 202 housing the electrical leads 204 for the unit 200. Conduit 202 has at its center a collar 206 by which it may be mounted on or hung from a ceiling or other suitable support. The burner unit 200 is suspended from the conduit 202 adjacent its opposite ends by tubular connectors 208 (FIGURE 8) adjacent the opposite ends of the unit 200 and conduit 202. Conduit 202 is arranged to isolate leads 204 and the support on which the heater is mounted from the heat emitted by the unit 200.

Referring to FIGURES 6 and 9, the heater unit 200 in this embodiment basically comprises an outer housing 210, a reflector 212, a pair of radiants 214 and 215 and a blower 216 (FIGURE 8).

Referring again to FIGURE 9, the housing 210 comprises a sheet metal member 217 having a top wall 218, converging depending side walls 219 and 220 and coplanar in-turned edge flanges 221 and 222 extending longitudinally thereof. The reflector 212 includes an elongated inverted channel-shape sheet metal member 223 having parallel side walls 224 and 225, a base wall 226 having curved portions 227 and 228 by which it is joined to side walls 224 and 225 and laterally outwardly extending flanges 229 and 230 overlying the housing flanges 221 and 222 respectively and fixed thereto by screws 232. In this embodiment, reflector member 223 has a substantially planar base wall 226 interrupted by a longitudinally extending V-shaped convexity 226a at its center. Reflector member 223 terminates at reflector end walls 234 and 236 and with housing member 217 defines a channel-shaped air chamber. The reflector end walls 234 (FIGURE 9) and 236 (FIGURE 6) are formed by upturned portions of housing plate or cover members 238 and 240 fixed to the housing flanges 221 and 222 at the opposite ends of the channel-shaped reflector member 223 by screws 242 and 244 as is shown in FIGURE 6.

The open side of the reflector is covered by an open wire grill 246 fixed to the housing 210 by the screws 232.

The radiants 214 and 215 are a quartz-type infra-red electrical heating elements of conventional structure having stainless steel ferrules 248 (FIGURE 8) at their opposite ends. This embodiment has been constructed in two commercial forms, a 2000 watt and a 3000 watt unit. In the 2000 watt unit, two 1000 watt heating elements or radiants 214 and 215 are provided and in the 3000 watt unit two 1500 watt heating elements 214 and 215 are provided. The dimensions of these elements 214 and 215 are the same as that for the commercial form of heating element 114 described above. Radiants 214 and 215 extend longitudinally of the channel formed by the reflector 212, their axes being equidistant from the center of reflector 212 and side walls 225 and 224 respectively and from base wall 226. Radiants 214 and 215 project at their opposite ends through the end plates 234 and 236 and are suspended from the housing top wall 218 at each end as is illustrated in FIGURE 8 for one end of radiant 214 by contact pressure clips 250. Clips 250 are fixed by bolts 252 to brackets 254 welded to the top wall 218 of housing 210. Bolts 252 are thermally and electrically isolated from the brackets 254 by the mating ceramic insulators 256 and 258. The reflector end walls 234 and 236 are each formed with a pair of upwardly opening notches 260, as is illustrated in FIGURE 9 in reference to the end wall 234 of reflector 212, the side walls of which embrace radiants 214 and 215 adjacent their ends.

As indicated above, in this embodiment the longitudinal axes of the radiants 214 and 215 are spaced equidistant from the parallel side walls 225 and 224, and from the center of reflector 212 and the base wall 226. The wall 224, the curved surface 227 and the adjacent portion of base wall 226 and face of convexity 226a form a reflector for radiant 215. The wall 225, the curved surface 228 and the adjacent portion of base wall 226 and face of convexity 226a form a reflector for radiant 214. Convexity 226a is sufficiently small that it does not block irradiation of either of radiants 214 and 215 by the other. This cross-irradiation increases the radiant operating temperature to the optimum 1600° F. range resulting in highly efficient heater operation.

By this arrangement, energy radiating from the radiants 214 and 215 against the channel-shaped reflector 212 will be directed outwardly through the open side thereof. The reflector 212 differs from prior art reflectors primarily in that the portions 224 and 225 are substantially parallel rather than divergent. The reflector 212 with its parallel side walls 224 and 225 directs the radiation emitted from the radiants 214 and 215 in a concentrated beam of radiant energy upon an object placed closely adjacent the open side of the channel of reflector 212 but widely diffuses the radiation if it is not intercepted closely adjacent the outlet if the reflector 212. This reflector 212 achieves the advantages of radiation concentration upon a closely positioned object and diffusion for general space heating in a high power multiple radiant heater. As the result, this unit as illustrated in FIGURES 6 through 10 can be used as a space heater mounted against the ceiling of a room or factory, for example, and provide efficient diffusion of radiant heat throughout the space to be heated and can also be used without modification for concentration of radiant energy upon a closely spaced object to be heated as for example in drying and curing of coatings upon sheet metal.

The opposite end walls of the housing 210 are formed by plate members 262 and 264 each of the construction illustrated in FIGURES 6 through 9 in detail for the end plate 262. End plates 262 and 264 are generally in the form of keystones each having a central opening 266 over which a grill 268 is secured by spot welding to the interior of the plate 262 as is best shown in FIGURE 9. Grill 268 is formed of expanded metal of conventional construction. The plate 262 has right angularly bent tabs 269 and 270 resulting in the openings 271 and 272, edge tabs 273 and 274 and bottom tab 275 which inter-fit within the open ends of the tubular housing structure formed by the channel-shaped housing member 219 and the plates 236 and 238 secured thereto. The end plates 262 and 264 may be secured in position by spot welding of these tabs to the channel-shaped member for example.

As is apparent from FIGURE 6, the space between the reflector end plate 234 and the housing end plate 262 is substantially greater than that between the reflector end plate 236 and the housing end plate 264. This greater spacing provides a chamber to receive the blower unit 216. This blower unit comprises an electrical motor 276 having a blower rotor in the form of a fan 277 secured to its output shaft 278. Motor 276 and fan 277 are identical with motor 176 and fan 177 except that motor 276 is a 220 volt motor in the commercial form of this unit. The unit 216 is resiliently suspended within the housing 210 by two sets of four springs 280 the springs of each set being arranged as is best illustrated in FIGURE 10. A channel member 281 is fixed to the top wall 218 of the housing and a channel member 282 is fixed between the longitudinally extending flanges 221 and 222 of the housing. Plates 283 and 284 are fixed to the stator of the motor 276 at opposite ends as is best illustrated in FIGURE 8. The springs 280 are each connected at one end to one of the channel members 281 and 282 and at the other end to one of the plates 283 and 284. These springs are tension-type coil springs and, in the installed position of the motor 276, are under tension. The axes of these springs lie in planes normal to the axis of rotation of shaft 278. By this construction, the entire blower unit 216 is resiliently suspended relative to the housing 210 so that any vibration resulting from its operation is isolated from housing 210 and radiants 214 and 215. Blower unit 216 induces flow of air through the grill 268 in the end plate 264 along the reflector 212 through the channel-shaped chamber formed between the member 217 of housing 210 and the exterior surface of the member 223 of reflector 212 and discharges air through the outlet grill 268 in the end plate 262. Access to the blower 216 for maintenance purposes is obtained by removal of the member 238.

Referring now to FIGURES 8 and 9, the conduit 202 comprises a sheet metal channel-shaped member 287 having converging side walls 288 and 289 and a cover member 290 coextensive in length with the channel member 287 and secured thereto by screws 291 as is best shown in FIGURE 7. Cover member 290 has laterally projecting longitudinally extending cooling fins 292 overlying in spaced relation the top wall 218 of the housing 210. These cooling fins 292 shield the support, such as a ceiling, from housing 210 and permit rapid dissipation to atmosphere of heat transmitted to the conduit 202 through the connectors 208 from the housing 210. The cover 290 is provided with an access opening 293 closed by a further cover member 294 fixed thereto by screws 295 providing access to the wiring 204 within the longitudinally extending opening through conduit 202.

As is best illustrated in FIGURE 9, the connectors 208 comprise an externally threaded bushing 296 extending through aligned apertures in the top wall 218 of the housing and the base wall of the conduit channel member 287 and fixed relative thereto by opposed pairs of nuts 297 and 298. The lead wires 204 extend through the bushings 296 and are connected to the terminal bolts 252 as shown in FIGURE 8 and to the motor 276 of blower 216.

By this construction, the wiring 204 is located in the conduit 202 which is isolated from the radiants 214 and 215 by the conduit 202 which is cooled by cooling fins 292, by the space between the channel member 287 and the top wall 218 of the housing 210 and by the channel-shaped stream of air flowing between the exterior of the reflector 212 and the interior of the housing 210 between the inlet end plate 264 and the outlet end plate 262 under the influence of the blower 216. The air flowing in this channel-shaped stream flows over the surface of the reflector 212 to cool it, flows over the interior surface of the housing 218 to prevent its heating to a temperature at which its exterior decorative paint would blister and isolates the insulated electrical leads 204 from high temperatures and thus avoids heat generated deterioration thereof. The air stream is isolated from radiants 214 and 215 and thus does not lower their surface temperature below the optimum 1600° F. value. The heated housing cooling air is discharged to the surrounding atmosphere and thus augments the radiant heating effect of radiants 214 and 215 as space heaters.

THIRD EMBODIMENT

The third embodiment is substantially identical to the first except that no blower is provided and the over-all length of the unit is reduced accordingly. Referring now to FIGURES 11 and 12, the third embodiment of the space heater of the present invention comprises a heater unit 300 and an elongated rigid conduit 302 housing the electrical leads 304 for the unit 300. Conduit 302 has a collar 306 by which the heater may be mounted to the ceiling or other suitable support. The burner unit 300 is suspended from the conduit 302 adjacent its opposite ends by tubular connectors 308 (FIGURE 13) adjacent the opposite ends of the unit 300 and conduit 302.

Figure 14:
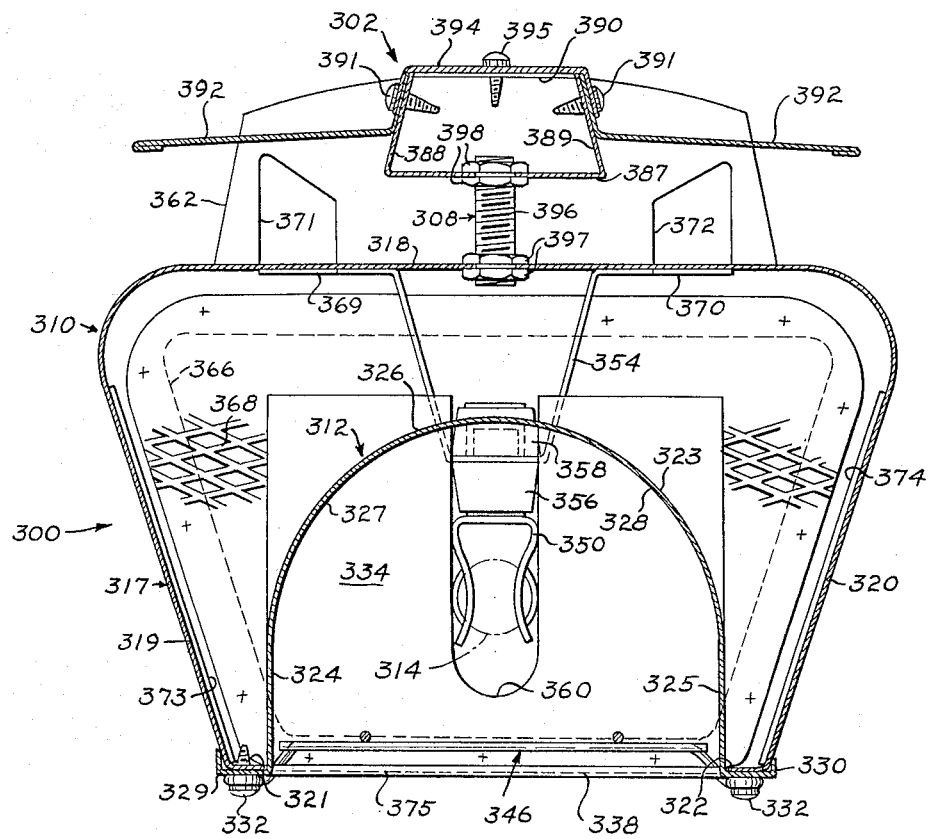
FIGURE 14 is a transverse sectional view taken substantially along the line 14—14 of FIGURE 13.

Referring to FIGURES 11 and 14, the heater unit 300 comprises an outer housing 310, a reflector 312 and a radiant 314.

The housing 310 comprises a sheet metal member 317 having a top wall 318, converging depending side walls 319 and 320, and co-planar in-turned edge flanges 321 and 322 extending longitudinally thereof. The reflector 312 has a sheet metal member 323 having parallel side walls 324 and 325, a base wall 326 having curved portions 327 and 328 by which it is joined to side walls 324 and 325 and laterally extending flanges 329 and 330 overlying the flanges 321 and 322 respectively and fixed thereto by screws 332. Reflector 312 is substantially identical with reflector 112 of the first embodiment. The end walls 334 (FIGURE 14) and 336 (FIGURE 11) of the reflector 312 are formed by upturned portions of plate members 338 and 340 fixed to the flanges 321 and 322 at opposite ends of the channel-shaped member of the reflector 312 by screws 342 and 344 as is shown in FIGURE 11.

The open side of the reflector 312 is covered by an open wire grill 346 fixed to the housing 310 by the screws 332.

The radiant 314 is a quartz-type infra-red heating element of conventional structure having stainless steel ferrules 348 (FIGURE 13) at its opposite ends. Radiant 314 extends longitudinally of the channel formed by the reflector 312 and projects at its opposed ends through the end plates 334 and 336 and is suspended from the housing top wall 318 at each end as it illustrated in FIGURE 13 by a contact pressure clip 350. Clips 350 are fixed by bolts 352 to brackets 354 welded to the top wall 318 of housing 310. Bolts 352 are thermally and electrically isolated from the bracket 354 by the mating ceramic insulators 356 and 358. The reflector end walls 334 and 336 are formed with upwardly opening notches 360 as is illustrated in FIGURE 14 in reference to the end wall 334 of reflector 312.

In this embodiment, the longitudinal axis of the radiant 314 is spaced equidistant from the parallel side walls 324 and 325 and at a distance from the base wall 326 which is less than the radius of curvature of this substantially semicylindrical end wall 326.

By this arrangement, energy radiating from the radiant 314 against the channel-shaped reflector 312 will be directed outwardly through the open side thereof. The reflector 312 differs from prior art reflectors primarily in that the portions 324 and 325 are substantially parallel rather than divergent. The axis of the radiant 314 is not located at the focus of the curvature of the reflector 312. Due to the parallel side walls 324 and 325 of the reflector 312, radiation emitted from the space heater 300 impinges in a concentrated beam of radiant energy upon an object placed closely adjacent the open side of the channel of reflector 312 but diffuses widely if radiation is not intercepted closely adjacent the outlet of the reflector. The reflector as illustrated in FIGURE 14 and in the relation to the radiant 314 as there illustrated has been found to produce an efficiency of 76%. This is thus an excellent reflector and achieves the advantages of radiation concentration upon a closely positioned object and diffusion for general space heating. The result is that this unit as illustrated in FIGURES 11 through 14 can be used as a space heater mounted against the ceiling of a room or factory, for example, and provide efficient diffusion of radiant heat throughout the space to be heated and also may be used without modification for concentration of radiant energy upon a closely spaced object to be heated as for example in drying and curing of coatings upon sheet metal.

The opposite ends of the housing 310 are formed by plat members 362 and 364 each of the construction illustrated in FIGURES 11 through 14 in detail for the end plate 362. End plate 362 and 364 are generally in the form of a keystone having a central opening 366 over which a grill 368 is secured by spot welding to the interior of the plate 362 as is best shown in FIGURE 14. Grill 368 is formed of expanded metal of conventional construction. The plate 362 has right angularly bent tabs 369 and 370 resulting in the openings 371 and 372, edge tabs 373 and 374 and bottom tab 375 which interfit within the open ends of the tubular housing structure formed by the channel-shaped housing member 317 and the plates 336 and 338 secured thereto. The end plates 362 and 364 may be secured in position by spot welding of these tabs to the channel-shaped member 317.

Referring now to FIGURES 13 and 14, the conduit 302 comprises a sheet metal channel-shaped member 387 having converging side walls 388 and 389 and a cover member 390 co-extension in length with the channel member 387 and secured thereto by screws 391 as is best shown in FIGURE 12. Cover member 390 has laterally projecting longitudinally extending cooling fins 392 overlying in spaced relation the top wall 318 of the housing 310. These cooling fins 392 permit rapid dissipation to atmosphere of heat transmitted to the conduit 302 through the connectors 308 from the housing 310. The cover 390 is provided with an access opening 393 closed by a further cover member 394 fixed thereto by screws 395 providing access to the wiring 304 within the longitudinally extending opening through conduit 302.

As is best illustrated in FIGURE 14, the connectors 308 comprise an externally threaded bushing 396 extending through aligned apertures in the top wall 318 of the housing and the base wall of the conduit channel member 387 and fixed relative thereto by opposed pairs of nuts 397 and 398. The lead wires 304 extend through the bushings 396 and are connected to the terminal bolts 352 as shown in FIGURE 13.

By this construction, the wiring 304 is located in the conduit 302 which is isolated from the radiant 314 by the conduit 302, which is cooled by cooling fins 392, by the space between the channel member 387 and the top wall 388 of the housing 310 and by the channel-shaped air chamber between the exterior of the reflector 312 and the interior of the housing 310.

FOURTH EMBODIMENT

The fourth embodiment is substantially identical to the second except that no blower is provided and the over-all length of the unit is reduced accordingly. Referring now to FIGURES 15 and 16, the fourth embodiment of the space heater of the present invention comprises a heater unit 400 and an elongated rigid conduit 402 housing the electrical leads 404 for the unit 400. Conduit 402 has a collar 406 by which the entire heater may be mounted on a ceiling or other suitable support. The burner unit 400 is suspended from the conduit 402 adjacent its opposite ends by tubular connectors 408 (FIGURE 17) adjacent the opposite ends of the unit 400 and conduit 402.

Referring to FIGURES 15 and 18, the heater unit 400 comprises an outer housing 410, a reflector 412, and a pair of radiants 414 and 415.

The housing 410 comprises a sheet metal member 417 having a top wall 418, converging depending side walls 419 and 420 and co-planar in-turned edge flanges 421 and 422 extending longitudinally thereof. The reflector 412 has a sheet metal member 423 having parallel side walls 424 and 425, a base wall 426, having curved portions 427 and 428 by which it is joined to side walls 424 and 425, and laterally extending flanges 429 and 430 overlying the flanges 421 and 422 respectively and fixed thereto by screws 432. The end walls 434 (FIGURE 18) and 436 (FIGURE 15) of the reflector 412 are formed by upturned portions of plate members 438 and 440 fixed to the flanges 421 and 422 at opposite ends of the channel-shaped member 423 of the reflector 412 by screws 442 and 444 as is shown in FIGURE 15.

The open side of the reflector is covered by an open wire grill 446 fixed to the housing 410 by the screws 432.

The radiants 414 and 415 are quartz-type infra-red heating elements of conventional structure having stainless steel ferrules 448 (FIGURE 17) at their opposite ends. Radiants 414 and 415 extend longitudinally of the channel formed by the reflector 412 and project at its opposite ends through the end plates 434 and 436 and are suspended from the housing top wall 418 at each end as is illustrated in FIGURE 17 by contact pressure clips 450. Clips 450 are fixed by bolts 452 to brackets 454 welded to the top wall 418 of housing 410. Bolts 452 are thermally and electrically isolated from the brackets 454 by the mating ceramic insulators 456 and 458. The reflector end walls 434 and 436 are formed with upwardly opening notches 460 as is illustrated in FIGURE 18 in reference to the end wall 434 of reflector 412. Reflector 412 is substantially identical with reflector 212 described in detail above. The longitudinal axes of the radiants 414 and 415 are oriented relative to reflector 412 in the same way that radiants 214 and 215 are oriented relative to reflector 212 as described above.

By this arrangement, energy radiating from the radiant 414 against the channel-shaped reflector 412 will be directed outwardly through the open side thereof. The reflector 412 differs from prior art reflectors in that the portions 424 and 425 are substantially parallel rather than divergent. The radiation emitted from the space heater 400 is directed in a concentrated beam of radiant energy upon an object placed closely adjacent the open side of the channel of reflector 412 but is widely diffused if the radiation is not intercepted closely adjacent the outlet of the reflector. This achieves the advantages of concentration upon a closely positioned object and diffusion for general space heating. The result is that this unit as illustrated in FIGURE 15 through 18 can be used as a space heater mounted against the ceiling of a room or factory, for example, and provide efficient diffusion of radiant heat throughout the space to be heated and also may be used without modification for concentration of radiant energy upon a closely spaced object to be heated, as for example in drying and curing of coatings upon sheet metal.

The opposite ends of the housing 410 are formed by plate members 462 and 464 each of the construction illustrated in FIGURES 15 through 18 in detail for the end plate 462. End plates 462 and 464 are generally in the form of keystones each having a central opening 466 over which a grill 468 is secured by spot welding to the interior of the plate 462 as is best shown in FIGURE 18. Grill 468 is formed of expanded metal of conventional construction. The plate 462 has right angularly bent tabs 469 and 470, resulting in the openings 471 and 472, edge tabs 473 and 474 and bottom tab 475 which inter-fit within the open ends of the tubular housing structure formed by the channel-shaped housing member 417 and the plates 436 and 438 secured thereto. The end plates 462 and 464 may be secured in position by spot welding of these tabs to the channel-shaped member 417.

Referring now to FIGURES 17 and 18, the conduit 402 comprises a sheet metal channel-shaped member 487 having converging side walls 488 and 489 and a cover member 490 coextensive in length with the channel member 487 and secured thereto by screws 491 as is best shown in FIGURE 16. Cover member 490 has laterally projecting longitudinally extending cooling fins 492 overlying in spaced relation the top wall 418 of the housing 410. These cooling fins 492 permit rapid dissipation to atmosphere of heat transmitted to the conduit 402 through the connectors 408 from the housing 410. The cover 490 is provided with an access opening 493 closed by a further cover member 494 fixed thereto by screws 495 providing access to the wiring 404 within the longitudinally extending opening through conduit 402.

As is best illustrated in FIGURE 18, the connectors 408 comprise an externally threaded bushing 496 extending through aligned apertures in the top wall 418 of the housing and the base wall of the conduit channel member 487 and fixed relative thereto by opposed pairs of nuts 497 and 498. The lead wires 404 extend through the bushings 496 and are connected to the terminal bolts 452 as shown in FIGURE 17.

By this construction, the wiring 404 is located in the conduit 402 which is isolated from the radiants 414 and 415 by the conduit 402 which is cooled by cooling fins 492, by the space between channel member 487 and the top wall 488 of the housing 410 and by the channel-shaped air chamber between the exterior of the reflector 412 and the interior of the housing 410.

FIFTH EMBODIMENT

The fifth embodiment is substantially identical to the second except for the blower structure, mounting and direction of exhaust. Referring now to FIGURES 19 and 20, the fifth embodiment of the space heater of the present invention comprises a heater unit 500 and an elongated rigid conduit 502 housing the electrical leads 504 for the unit 500. Conduit 502 has a collar 506 by which the entire heater may be mounted on a ceiling or other suitable support. The burner unit 500 is suspended from the conduit 502 adjacent its opposite ends by tubular connectors 508 (FIGURE 21) adjacent the opposite ends of the unit 500 and conduit 502.

Figure 22:
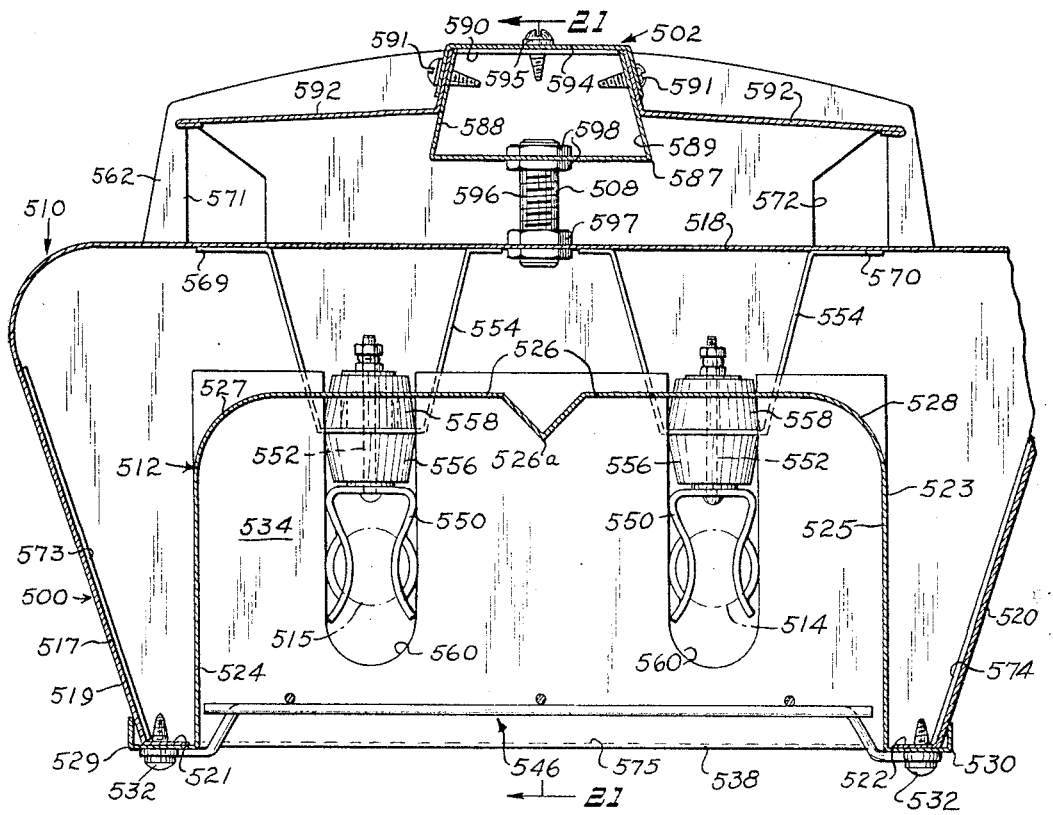
FIGURE 22 is a transverse sectional view taken substantially along the line 22—22 of FIGURE 21.

Referring to FIGURES 19 and 22, the heater unit 500 comprises an outer housing 510, a reflector 512, a pair of radiants 514 and 515 and a blower 516 (FIGURE 21).

Referring again to FIGURE 22, the housing 510 comprises a sheet metal member 517 having a top wall 518, converging depending side walls 519 and 520, and coplanar in-turned edge flanges 521 and 522 extending longitudinally thereof. The reflector 512 has a sheet metal member 523 having parallel side walls 524 and 525, a base wall 526 having curved portions 527 and 528 by which it is joined to side walls 524 and 525 and laterally extending flanges 529 and 530 overlying the flanges 521 and 522 respectively and fixed thereto by screws 532. The end walls 534 (FIGURE 22) and 536 (FIGURE 19) of the reflector 512 are formed by upturned portions of plate members 538 and 540 fixed to the flanges 521 and 522 at opposite ends of the channel-shaped member 523 of the reflector 512 by screws 542 and 544 as is shown in FIGURE 19. Reflector 512 is thus substantially identical with reflectors 212 and 412 described above.

The open side of the reflector is covered by an open wire grill 546 fixed to the housing 510 by the screws 532.

The radiants 514 and 515 are quartz-type infra-red heating elements of conventional structure having stainless steel ferrules 548 (FIGURE 21) at their opposite ends. Radiants 514 and 515 extend longitudinally of the channel formed by the reflector 512 and project at its opposite ends through the end plates 534 and 536 and are each suspended from the housing top wall 518 at each end, as is illustrated in FIGURE 21, by contact pressure clips 550. Clips 550 are fixed by bolts 552 to brackets 554 welded to the top wall 518 of housing 510. Bolts 552 are thermally and electrically isolated from the brackets 554 by the mating ceramic insulators 556 and 558. The reflector end walls 534 and 536 are formed with upwardly opening notches 560, as is illustrated in FIGURE 22, in reference to the end wall 534 of reflector 512.

The relation of the radiants 514 and 515 to the walls of the reflector 512 is the same as described above as to radiants 214 and 215 and reflector 212 and produces the same dual purpose radiation pattern.

The opposite ends of the housing 510 are formed by plate members 562 and 564. Plate 564 is substantially identical to plates 264 and 262 described above, having a central opening over which a grill is secured by spot welding to the interior of the plate 564, the grill being formed of expanded metal of conventional construction. Plate 562 has no end opening. The plates 562 and 564 have right angularly bent tabs 569 and 570 resulting in the openings 571 and 572, edge tabs 573 and 574 and bottom tab 575 which inter-fit within the open ends of the tubular housing structure formed by the channel-shaped housing member 517 and the plates 536 and 538 secured thereto. The end plates 562 and 564 may be secured in position by spot welding of these tabs to the channel-shaped member 517.

Figure 23:
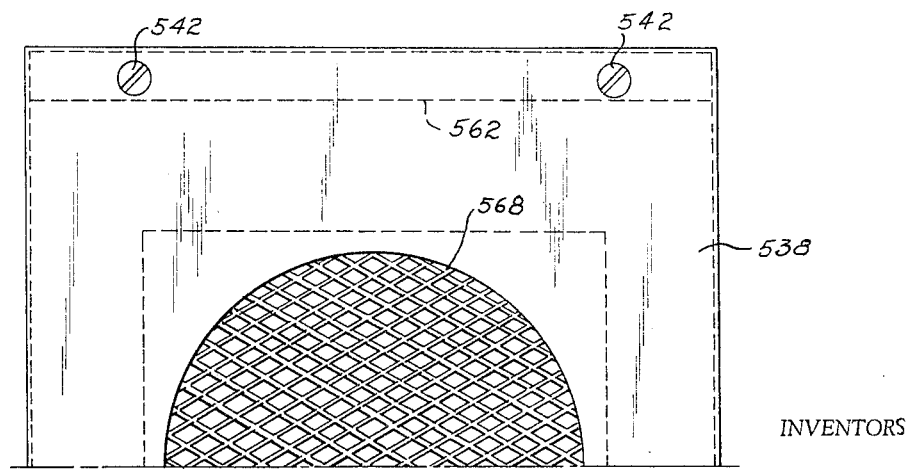
FIGURE 23 is a fragmentary bottom view in elevation of the heater of FIGURE 19.

As is apparent from FIGURE 19, the space between the reflector end plate 534 and the housing end plate 562 is substantially greater than that between the reflector end plate 536 and the housing end plate 564. This greater spacing provides a chamber to receive the blower unit 516. This blower unit comprises an electrical motor 576 having a blower rotor in the form of a fan 577 secured to its output shaft 578. The unit 516 is resiliently suspended within the housing 510 by four springs 580 as is best illustrated in FIGURE 21. A mounting bracket 581 is fixed to the top wall 518 of the housing and a plate 583 is fixed to the stator of the motor 576. The springs 580 are connected at their tops to the member 581 and at their bottoms to the plate 583. These springs are tension-type coil springs and in the installed position of the motor 576 are under tension due to the weight of the unit 516. The axes of these springs are parallel to the axis of rotation of shaft 578. By this construction, the entire blower unit 516 is resiliently suspended relative to the housing 510 so that any vibration resulting from its operation will not be transmitted to housing 510 or radiants 514 and 515. Blower unit 516 induces flow of air through the grill in the end plate 564 along the reflector 512 through the channel-shaped chamber formed between member 517 of the housing 510 and the exterior surface of the member 523 of reflector 512 and discharges air downwardly through the outlet grill 568 (FIGURE 23) in the member 538. Access to the blower 516 for maintenance purposes is obtained by removal of the member 538.

Referring now to FIGURES 21 and 22, the conduit 502 comprises a sheet metal channel-shaped member 587 having converging side walls 588 and 589 and a cover member 590 co-extensive in length with the channel member 587 and secured thereto by screws 591 as is best shown in FIGURE 20. Cover member 590 has laterally projecting longitudinally extending cooling fins 592 overlying in spaced relation the top wall 518 of the housing 510. These cooling fins 592 permit rapid dissipation to atmosphere of heat transmitted to the conduit 502 through the connectors 508 from the housing 510. The cover 590 is provided with an access opening 593 closed by a further cover member 594 fixed thereto by screws 595 providing access to the wiring 504 within the longitudinally extending opening through conduit 502.

As is best illustrated in FIGURE 22, the connectors 508 comprise an externally threaded bushing 596 extending through aligned apertures in the top wall 518 of the housing and the base wall of the conduit channel member 587 and fixed relative thereto by opposed pairs of nuts 597 and 598. The lead wires 504 extend through the bushings 596 and are connected to the terminal bolts 552 as shown in FIGURE 22 and to the motor 576 of blower 516.

By this construction, the wiring 504 is located in the conduit 502 which is isolated from the radiant 514 by the conduit 502 which is cooled by cooling fins 592, by the space between the channel member 587 and the top wall 588 of the housing 510 and by the channel-shaped stream of air flowing between the exterior of the reflector 512 and the interior of the housing 510 between the inlet end plate 564 and the outlet end plate 562 under the influence of the blower 516. The air flowing in this channel-shaped stream flows over the surface of the reflector 512 to cool it, flows over the interior surface of the housing 518 to prevent its heating to a temperature at which its exterior decorative paint would blister and by isolating the insulated electrical leads 504 from high temperatures, avoids heat generated deterioration thereof. This air stream is isolated from radiants 514 and 515 and thus does not lower their surface temperature of 1600° F. resulting from their cross-irradiation. The heated air is discharged through grill 568 in the same direction as that of the radiant energy emitted so that the heating of an object being irradiated is augmented by the heat of the hot air stream.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An electrically powered radiant heater unit comprising as a unitary sturucture:
    (a) an elongated rigid electrical conduit containing insulated electrical wires;
    (b) a downwardly open elongated electrically powered infra-red radiant heater unit having a shield means substantially coextensive with and parallel to said conduit, a reflector supported by said shield means and at least one radiant supported by said shield means and mounted in front of said reflector so that heat from said radiant is directed outwardly of the heater unit;
    (c) suspension means suspending said shield means in spaced relation to said conduit, said spaced relation being substantially equal throughout the lengths of said shield means and said conduit and said suspension means being structurally independent of and readily detachable from said conduit; and
    (d) means associated with and disposed along said suspension means for electrically connecting said radiant to said wires in said conduit.

2. The heater defined in claim 1 wherein said suspension means are hollow and wherein said connecting means extend through said suspending means.

3. The heater defined in claim 1 wherein said conduit is formed of sheet metal.

4. The heater defined in claim 1 wherein said conduit has at least one cooling fin thereon to dissipate heat transferred thereto from said heater unit.

5. The heater defined in claim 1 wherein said conduit has at least one laterally projecting longitudinally extending cooling fin.

6. The heater defined in claim 5 wherein said fin and conduit are substantially coextensive in length.

7. The heater defined in claim 1 wherein said conduit comprises an upwardly open sheet metal channel and a sheet metal cover closing the top of said channel.

8. The heater defined in claim 7 wherein said cover has extensions projecting laterally from each side of said channel and forming cooling fins for said conduit and a shield above said heater unit.

9. The radiant heater defined in claim 1 wherein said reflector is channel-shaped having substantially parallel side walls and a base wall joined to said side walls and a plurality of radiants are mounted in front of said reflector.

10. The heater defined in claim 9 wherein the reflector base wall is curved where it joins the side walls and the remainder of said reflector base wall is substantially planar.

11. The heater defined in claim 10 wherein the planar portion of said reflector base wall is interrupted at its center by a convex longitudinally extending projection into the channel defined by said reflector.

12. The heater defined in claim 11 wherein said plurality of radiants comprises:
    (a) a pair of radiants;
    (b) each radiant of said pair being spaced equidistant from the center of the channel defined by said reflector and from one of the side walls thereof.

13. The heater defined in claim 12 wherein the spacing of the longitudinal axes of said radiants from the planar portion of said base wall is substantially equal to the spacing of their longitudinal axes from the adjacent one of said side walls.

14. The heater defined in claim 1 having means interconnecting said reflector and said shield to form a substantially unobstructed air passage chamber therebetween 15. The heater defined in claim 14 wherein said reflector has lower edges a said reflector and said shield are interconnected at the lower edges of said reflector by said interconnecting means.

16. An electrically powered radiant heater comprising:
    (a) an elongated radiant;
    (b) an elongated channel-shaped reflector having a base wall and substantially parallel side walls depending therefrom disposed in surrounding relation to said radiant, said reflector being closed at each end;
    (c) an elongated channel-shaped housing enveloping the exterior of said reflector and being interconnected therewith at the channel edges to define a substantially unobstructed channel-shaped air chamber between, said housing having side walls which converge inwardly toward said reflector;

(d) means for permitting circulation of air in said air chamber to cool said reflector and housing; and (e) means for inducing air circulation through said channel-shaped chamber.

17. The heater defined in claim 16 wherein said means for permitting circulation of air comprises an opening at each end of said air chamber to permit circulation of air longitudinally of said channel-shaped chamber.

18. The heater defined in claim 17 wherein at least one of said housing openings faces in the same direction as the open side of said channel-shaped reflector.

19. The heater defined in claim 17 wherein said inducing means comprises an electric motor driven blower mounted on said housing at one end of said housing between the opening in said housing one end and the adjacent end of said channel-shaped chamber.

20. The heater defined in claim 19 wherein the rotor of said blower is formed to induce flow of air from the adjacent end of said channel-shaped chamber and discharged air through the opening in said housing one end.

21. The heater defined in claim 20 wherein the housing has end walls and the opening in said housing one end is in the end wall of said housing.

22. The heater defined in claim 21 wherein the opening in said housing one end faces in the same direction as the open side of said channel-shaped reflector so that air discharged therethrough flows in the direction of radiation from said radiant.

23. The heater defined in claim 19 wherein said blower is resiliently suspended in said housing to prevent transmission of the vibrations thereof to said radiant.

24. The heater defined in claim 19 wherein said blower is resiliently mounted in said housing solely by a plurality of tension springs connected to said blower and to said housing and substantially symmetrically arranged about the blower rotor rotation axis.

25. An electrically powered radiant heater unit comprising as a unitary structure:
(a) an elongated radiant;
(b) an elongated channel-shaped reflector disposed in surrounding relation to said radiant and closed at each end;
(c) a housing enveloping the exterior of said reflector and being interconnected therewith at the channel edges to define a substantially unobstructed channel-shaped air chamber therebetween;
(d) a rigid conduit extending longitudinally of said housing at the side thereof remote from the opening of the channel of said reflector;
(e) hollow means located adjacent the opposite ends of said reflector suspending said housing from said conduit said hollow means being structurally independent of and detachable from said conduit, and
(f) electrical leads extending through said conduit and said hollow means into said housing at the opposite ends of said reflector and electrically connected to the opposite ends of said radiant whereby said electrical leads are isolated from said radiant by said channel-shaped chamber and by the air space between said conduit and the adjacent wall of said housing.

26. The heater defined in claim 25 wherein said housing has an opening at each end to permit circulation of air longitudinally of said channel-shaped chamber to cool said reflector and housing.

27. The heater defined in claim 26 further comprising means for inducing flow of air longitudinally of said channel-shaped chamber from one of said housing openings through the other.

28. The heater defined in claim 25 wherein said conduit has laterally projecting longitudinally extending cooling fins lying substantially in uniform spaced relation to the adjacent wall of said housing.

References Cited by the Examiner

UNITED STATES PATENTS

| | | | |
|---|---|---|---|
| 1,077,676 | 11/1913 | Cubitt | 219—347 |
| 1,450,022 | 3/1923 | Doyle | 29—348 |
| 1,491,736 | 4/1924 | Polk. | |
| 2,131,484 | 9/1938 | Ringwald | 219—377 |
| 2,369,803 | 2/1945 | Sardeson | 219—347 |
| 2,492,379 | 12/1934 | Cranston | 219—347 |
| 2,822,457 | 2/1958 | Hatch | 219—347 X |
| 2,891,136 | 6/1959 | Nathanson | 219—347 X |
| 2,951,928 | 9/1960 | Gialanella | 219—347 |
| 3,008,029 | 11/1961 | Davis et al. | 219—347 X |
| 3,015,711 | 1/1962 | Bridwell | 219—347 X |
| 3,141,089 | 7/1964 | Hultgreen | 219—352 |

FOREIGN PATENTS

| | | |
|---|---|---|
| 236,085 | 6/1959 | Australia. |
| 1,120,122 | 4/1956 | France. |
| 264,814 | 12/1927 | Great Britain. |
| 695,284 | 8/1953 | Great Britain. |
| 790,441 | 2/1958 | Great Britain. |
| 876,555 | 9/1961 | Great Britain. |

OTHER REFERENCES

Siemens, German application Ser. No. S 29,419, printed Aug. 16, 1956 (KL. 21h 9), 2 pages spec., 1 sheet drawing.

ANTHONY BARTIS, *Acting Primary Examiner.*

RICHARD M. WOOD, *Examiner.*

UNITED STATES PATENT OFFICE
CERTIFICATE OF CORRECTION

Patent No. 3,278,722

October 11, 1966

John J. Fannon, Jr., et al.

It is hereby certified that error appears in the above numbered patent requiring correction and that the said Letters Patent should read as corrected below.

Column 6, line 71, for "if" read -- of --; column 9, line 1, for "it" read -- is --; line 43, for "plat" read -- plate --; column 14, line 60, for "a" read -- and --.

Signed and sealed this 29th day of August 1967.

(SEAL)
Attest:

ERNEST W. SWIDER
Attesting Officer

EDWARD J. BRENNER
Commissioner of Patents